US012786179B2

(12) United States Patent
Isaacs

(10) Patent No.: US 12,786,179 B2
(45) **Date of Patent: *Nov. 3, 2026**

(54) SYSTEMS, METHODS, AND DEVICES FOR AUTOMATION AND INTEGRATION OF CREDENTIALING AND AUTHENTICATION IN WORKFLOWS ASSOCIATED WITH COMPUTING PLATFORMS

(71) Applicant: Salesforce, Inc., San Francisco, CA (US)

(72) Inventor: Charles Hart Isaacs, Annapolis, MD (US)

(73) Assignee: Salesforce, Inc., San Francisco, CA (US)

(*) Notice: Subject to any disclaimer, the term of this patent is extended or adjusted under 35 U.S.C. 154(b) by 92 days.

This patent is subject to a terminal disclaimer.

(21) Appl. No.: 18/895,139

(22) Filed: Sep. 24, 2024

(65) Prior Publication Data

US 2025/0016146 A1 Jan. 9, 2025

Related U.S. Application Data

(63) Continuation of application No. 17/231,993, filed on Apr. 15, 2021, now Pat. No. 12,132,716.

(51) Int. Cl.
*H04L 9/40* (2022.01)
*G06F 9/54* (2006.01)

(52) U.S. Cl.
CPC ................ *H04L 63/08* (2013.01); *G06F 9/54* (2013.01); *H04L 63/102* (2013.01)

(58) Field of Classification Search
CPC ..... H04L 63/08; H04L 63/102; H04L 63/107; H04L 63/0807; G06F 9/54
See application file for complete search history.

(56) References Cited

U.S. PATENT DOCUMENTS 9,185,342 B2 11/2015 Isaacs
9,444,857 B2 9/2016 Isaacs et al.
(Continued)

FOREIGN PATENT DOCUMENTS

CA 3021361 A1 1/2019

OTHER PUBLICATIONS

U.S. Appl. No. 17/231,988, Non Final Office Action mailed Nov. 8, 2022, 10 pgs.

(Continued)

*Primary Examiner* — Khoi V Le
(74) *Attorney, Agent, or Firm* — Polygon IP, LLP

(57) ABSTRACT

A computing platform is configurable to cause initiating a communication session with a user, the user having a user account associated with a workflow data object implemented in an on-demand application hosted by the computing platform, the workflow data object being configured to represent a plurality of operations associated with the user and an organization, and further associated with a vaccination status of the user. The computing platform is configurable to cause identifying a verified status indicator used by at least one of the plurality of operations represented in the workflow data object, the verified status indicator comprising a verified credential associated with at least one of the plurality of operations. The computing platform is configurable to cause identifying a transfer operation associated with the verified status indicator and identifying a target entity based on the user account, and implementing the identified transfer operation based on the identified target entity.

17 Claims, 18 Drawing Sheets

(56) References Cited

U.S. PATENT DOCUMENTS

| | | | |
|---|---|---|---|
| 9,626,523 | B2 | 4/2017 | Isaacs et al. |
| 9,990,636 | B1 | 6/2018 | Lewis et al. |
| 9,992,242 | B2 | 6/2018 | Isaacs et al. |
| 10,089,638 | B2 | 10/2018 | Rohde et al. |
| 10,296,717 | B2 | 5/2019 | Isaacs et al. |
| 10,313,476 | B2 | 6/2019 | Isaacs et al. |
| 10,585,720 | B1 * | 3/2020 | Kesler .................... G06F 16/211 |
| 10,623,555 | B2 | 4/2020 | Elizondo et al. |
| 10,630,694 | B1 | 4/2020 | Sterman-Kabrt et al. |
| 10,715,459 | B2 | 7/2020 | Isaacs |
| 10,795,743 | B2 | 10/2020 | Sur et al. |
| 11,171,939 | B1 * | 11/2021 | Blank ...................... H04L 63/18 |
| 11,579,929 | B2 | 2/2023 | Isaacs |
| D980,270 | S | 3/2023 | Andolina et al. |
| D980,271 | S | 3/2023 | Andolina et al. |
| D980,272 | S | 3/2023 | Andolina et al. |
| 11,663,169 | B2 | 5/2023 | Isaacs |
| 11,755,698 | B2 | 9/2023 | Isaacs |
| 11,842,731 | B2 | 12/2023 | Isaacs et al. |
| 12,010,034 | B2 | 6/2024 | Isaacs |
| 2004/0241627 | A1 | 12/2004 | Delfing |
| 2006/0160059 | A1 | 7/2006 | Dompier et al. |
| 2011/0126275 | A1 * | 5/2011 | Anderson ................ H04L 63/14 726/8 |
| 2013/0132122 | A1 | 5/2013 | Walsh et al. |
| 2014/0029751 | A1 * | 1/2014 | Swineford ........... H04L 63/0428 380/279 |
| 2014/0123312 | A1 | 5/2014 | Marcotte |
| 2014/0173711 | A1 * | 6/2014 | Zlatarev .............. H04L 63/0815 726/8 |
| 2015/0281322 | A1 | 10/2015 | Dingwell et al. |
| 2016/0065585 | A1 | 3/2016 | Corte et al. |
| 2016/0155152 | A1 | 6/2016 | Isaacs |
| 2017/0006063 | A1 | 1/2017 | Sundaram |
| 2018/0365713 | A1 | 12/2018 | Rohde et al. |
| 2019/0149579 | A1 | 5/2019 | Kakumani et al. |
| 2019/0354428 | A1 | 11/2019 | Sur et al. |
| 2020/0213311 | A1 | 7/2020 | Saha et al. |
| 2020/0328885 | A1 * | 10/2020 | Tola ....................... G06F 21/575 |
| 2020/0344176 | A1 | 10/2020 | Isaacs |
| 2020/0389319 | A1 | 12/2020 | Wise et al. |
| 2021/0073034 | A1 * | 3/2021 | Bliesner .............. G06F 9/45558 |
| 2021/0224824 | A1 | 7/2021 | Bowers |
| 2021/0226951 | A1 * | 7/2021 | Goldstein ........... H04L 63/0884 |
| 2021/0233094 | A1 | 7/2021 | Isaacs |
| 2021/0319915 | A1 | 10/2021 | Ahmed et al. |
| 2022/0335110 | A1 | 10/2022 | Isaacs |
| 2022/0337569 | A1 | 10/2022 | Isaacs |
| 2024/0070347 | A1 | 2/2024 | Isaacs |
| 2024/0095220 | A1 | 3/2024 | Isaacs et al. |
| 2024/0143652 | A1 | 5/2024 | Isaacs et al. |

OTHER PUBLICATIONS

U.S. Appl. No. 17/231,988, Notice of Allowance mailed May 5, 2023, 11 pgs.

U.S. Appl. No. 17/231,993, Advisory Action mailed Jan. 25, 2024, 3 pgs.

U.S. Appl. No. 17/231,993, Final Office Action mailed Oct. 26, 2023, 11 pgs.

U.S. Appl. No. 17/231,993, Non Final Office Action mailed Apr. 27, 2023, 14 pgs.

U.S. Appl. No. 17/231,993, Notice of Allowance mailed Jun. 28, 2024, 13 pgs.

* cited by examiner

SYSTEMS, METHODS, AND DEVICES FOR AUTOMATION AND INTEGRATION OF CREDENTIALING AND AUTHENTICATION IN WORKFLOWS ASSOCIATED WITH COMPUTING PLATFORMS

CROSS-REFERENCE TO RELATED APPLICATIONS

This application is a Continuation of U.S. patent application Ser. No. 17/231,993, filed Apr. 15, 2021, which is incorporated by reference herein in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to on-demand computing platforms and more specifically to integration of credentialing with such computing platforms.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Cloud-based services may include software applications that enable the observation and management of operations of an entity, such as a user. For example, on-demand software applications may be used to log data events associated with a user's progression through a designated series of operations. However, such applications remain limited in their ability to verify the status of particular operations, and manage such operations based on such verification.

BRIEF DESCRIPTION OF THE DRAWINGS

The included drawings are for illustrative purposes and serve only to provide examples of possible structures and operations for the disclosed inventive systems, apparatus, methods and computer program products for credentialing and authentication integration. These drawings in no way limit any changes in form and detail that may be made by one skilled in the art without departing from the spirit and scope of the disclosed implementations.

DETAILED DESCRIPTION

Figure 1:
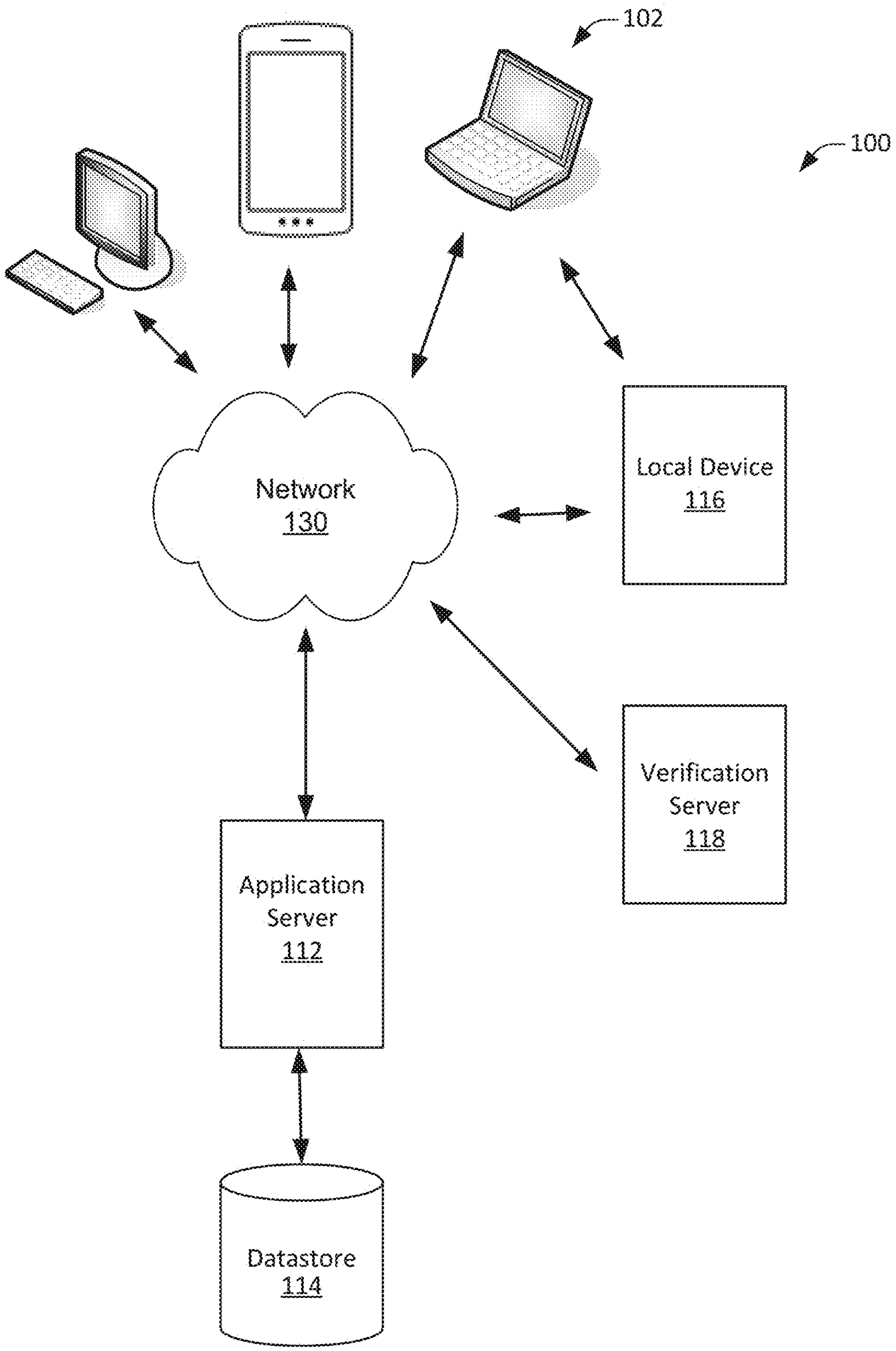
FIG. 1 illustrates an example of an arrangement of components in a credentialing and authentication system, configured in accordance with one or more implementations.

A variety of cloud-based services may be supported to provide software applications that enable the observation and management of operations of an organization. Accordingly, users, that may be members of an organization or a company, may access such software applications via one or more client devices. However, some software applications remain limited in their ability to authenticate actions taken by users and to provide integration of secure and trusted authentication in the context of such operations of an organization.

Implementations disclosed herein enable the integration of authentication and credentialing systems with workflow data object management systems to enable seamless utilization of such credentials in a distributed and heterogenous computing environment. As will be discussed in greater detail below, a computing platform may provide a configuration tool that is configured to enable the creation and deployment of a workflow data object. As will also be discussed in greater detail below, various operations included in the workflow data object may be configured to implement various authentication and verification operations using verified status indicators, which may include credentials supported by a verification platform. Such operations may implement such credentials via one or more custom APIs. In this way, a user may progress through a workflow, and operations within the workflow may be configured to support authentication and credentialing for a particular outcome. Moreover, one or more components of the on-demand application may be configured to guide a user through a process of managing stored verified status indicators as well manage the sharing and distribution of such verified status indicators.

In one example, a user may have various verified status indicators stored in a user account associated with an on-demand software application. For example, the user may have a user profile, and a designated storage location within a database system associated with such a user profile. In various implementations, verified status indicators used to verify the user's completion of various operations may be stored in such a designated storage location. Moreover, components of the on-demand software application, such as a chatbot, may facilitate the management of such verified status indicators. In one example, the user may decide to share a credentialed data object with another entity, such as a pharmacy or a travel agency. One or more components of a computing platform may initiate a communications session with the user to authenticate the user. The computing platform may then identify the target entity to which a credential is to be shared. Such an identification may be provided by an input from the user. The computing platform may then initiate a communications session with the target entity, authenticate the target entity, authenticate itself to the target entity, and then initiate the transfer of the verified status indicator including the credentialed data object. In this way, the computing platform may manage distribution and ingestion of verified status indicators in a secure and authenticated computing environment.

FIG. 1 illustrates an example of an arrangement of components in a credentialing and authentication system, configured in accordance with one or more implementations. As will be discussed in greater detail below, a system, such as system 100, may be implemented to facilitate the generation and implementation of a workflow data object. Moreover, system 100 may also facilitate the generation and integration of verified status indicators within the workflow data object. In this way, components of a workflow management application may be augmented to include authentication and verification capabilities.

In some implementations, system 100 includes one or more client machines, which may also be referred to herein as client devices, such as client machine 102. In various implementations, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various implementations, client machine 102 comprises one or more processors configured to execute one or more applications that may utilize a user interface. Accordingly, a user may request and view various different display screens associated with such applications via client machine 102. In various implementations, a user interface may be used to present the display screen to the user, as well as receive one or more inputs from the user. In some implementations, the user interface may utilize a web browser executed on client machine 102 or may be a standalone locally executed application. Moreover, such user interfaces may be used to access on-demand services and software applications, as will be discussed in greater detail below.

In various implementations, system 100 further includes one or more application servers, such as application server 112, and various client devices may be communicatively coupled to application server 112. In various implementations, application server 112 is configured to include software and hardware that provides an environment for the execution of an application. As will be discussed in greater detail below, the application may be a workflow management application. Accordingly, the software application may be configured to enable the generation of one or more workflow data objects that may be used to define workflows associated with users. As will be discussed in greater detail below, such workflow data objects may identify a sequence of operations and outcomes or actions associated with such operations. For example, a workflow data object may identify a sequence of operations a user must take to return to work. Such operations may include interactions between various system components, such as client machine 102 and various servers and devices discussed in greater detail below. Accordingly, the application hosted by application server 112 may be configured to monitor such interactions, track a user's progress through a defined workflow, and implement one or more operations if appropriate.

Application server 112 may include one or more processors and memory configured execute a software application. Accordingly, application server 112 may be configured to store program code and settings for a particular application, and may also be configured to execute the code. Moreover, application server 112 may be in communication with numerous client devices, and may implement the application in a distributed manner. In some implementations, application server 112 is further configured to generate and serve webpages that may be viewed by a user via one or more devices, such as client machine 102. Accordingly, application server 112 is configured to provide a web-based interface between a user of client machine 102 and an application that is deployed in a distributed environment. In various implementations, the application may also be configured to include an application interface that is configured to couple with one or more other entities, such as a computing platform discussed in greater detail below. In some implementations, application server 112 is coupled to datastore 114 which may be configured to store various application data and data associated with webpages served by application server 112, and thus may provide local storage for application server 112.

In various implementations, system 100 additionally includes verification server 118 which is configured to implement one or more verification operations. As will be discussed in greater detail below, verification server 118 is configured to implement one or more verification and authentication operations. More specifically, verification server 118 may be configured to generate verified status indicators that may include authenticated credentials. As will be discussed below, such verified status indicators may be generated to provide a trusted and secure identification of a particular status or set of conditions. For example, a verified status indicator may identify that a particular user has completed a particular operation within a workflow. In this example, the verified status indicator may include one or more data values authenticating the user and verifying that an operation has been completed. In various implementations, verification server 118 may be part of a larger verification system. Accordingly, verification server 118 may be coupled to other components, such as a database system and other application servers.

In some implementations, verification server 118 is configured to implement digital privacy services for one or more users. Accordingly, verification server 118 may be communicatively coupled to various client devices, and may store and maintain various private data associated with such users. For example, verification server 118 may use blockchain techniques to securely store and manage various health and patient information associated with a user. In this way, verification server 118 may be part of a verification system that is configured to implement a digital health passport platform. Accordingly, as will be discussed in greater detail below, operations of verification server 118 may be integrated in a computing platform.

System 100 further includes local device 116 which may be communicatively coupled to client machine 102 as well as other system components via network 130. In various implementations, local device 116 is a device that may be collocated with client machine 102 and its associated user. Accordingly, client machine 102 may interact with local device 116, and such an interaction may be detected by application server 112 and/or may trigger one or more operations by verification server 118. For example, local device 116 may be a computer or a beacon at a particular location, such as a pharmacy. Local device 116 may interact with client machine 102, and a notification identifying the interaction may be sent to application server 112, which may then update a workflow data object based on the notification if appropriate. In various implementations, the interaction may be detected by verification server 118, and verification server 118 may generate a verified status indicator if appropriate. The verified status indicator may be sent to application server 112 and integrated with the workflow data object. Additional details regarding such interactions, generation of verified status indicators, and updates of workflow data objects are discussed in greater detail below.

Figure 2:
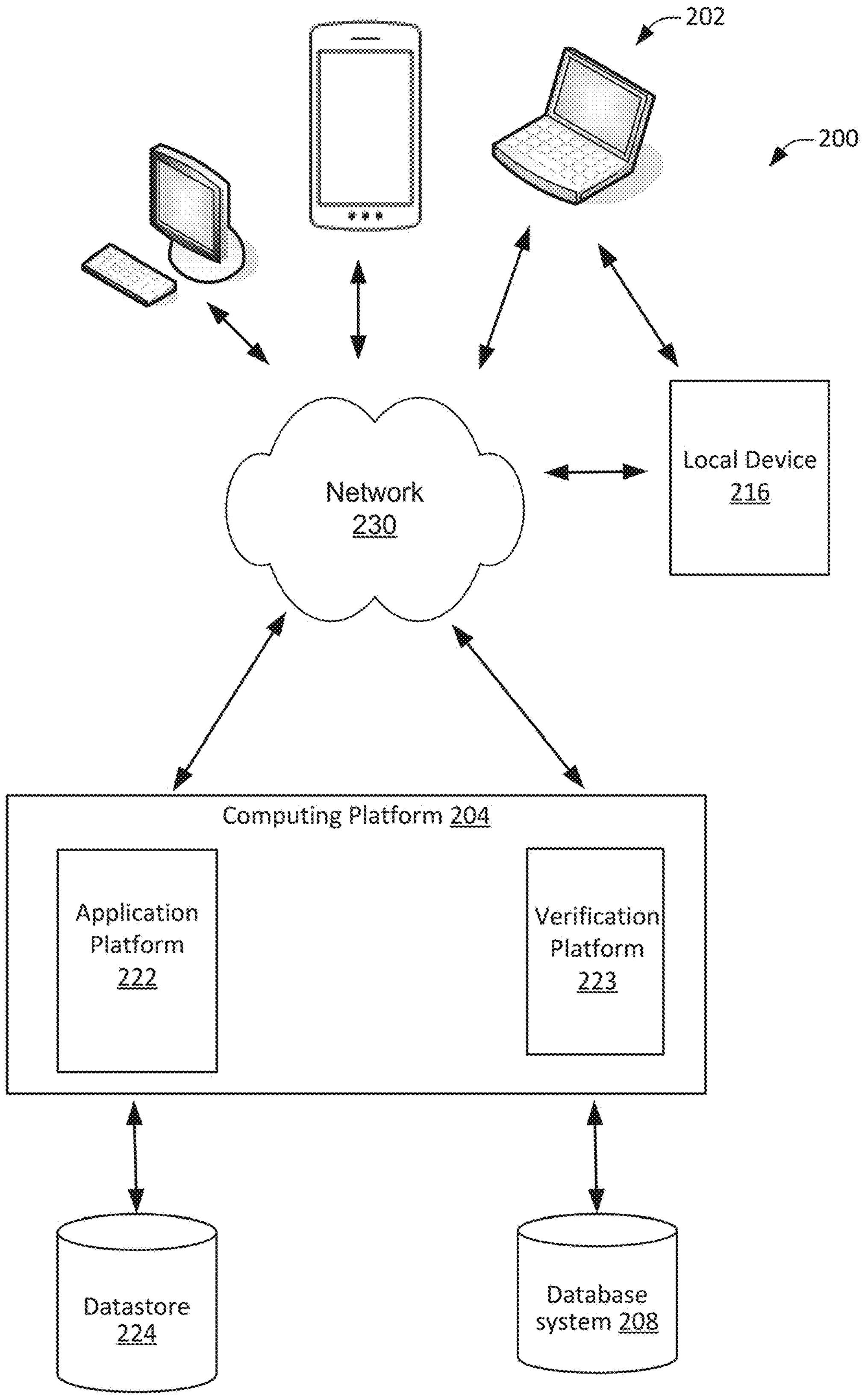
FIG. 2 illustrates another example of an arrangement of components in a credentialing and authentication system, configured in accordance with one or more implementations.

FIG. 2 illustrates another example of an arrangement of components in a credentialing and authentication system, configured in accordance with one or more implementations. As similarly discussed above, a system, such as system 200, may be implemented to facilitate the generation and implementation of a workflow data object. In various implementations, system 200 may be configured to facilitate the generation and integration of verified status indicators within the context of a computing platform. Accordingly, as will be discussed in greater detail below, a computing platform may be configured and implemented to facilitate a workflow management application and also handle the integration of authentication and verification capabilities.

As similarly discussed above, system 200 includes client machines, such as client machine 202 and local device 216 which may be communicatively coupled to each other, and may also be communicatively coupled to a communications network, such as network 230. As shown in FIG. 2, system 200 additionally includes computing platform 204 which is configured to include components that facilitate the implementation of the workflow management application as well as the verification and authentication operations. Accordingly, computing platform 204 may include application platform 222 which may be coupled to datastore 224. In various implementations, application platform 222 is configured to enable the generation of one or more workflow data objects that may be used to define workflows associated with users. Computing platform 204 may also include verification platform 223 which is configured to implement digital privacy services for one or more users, and generated verified status indicators, as will be discussed in greater detail below.

In this way, the aspects of workflow data object generation, updating and management may be integrated with authentication and verification operations in a single computing platform. In various implementations, computing platform 204 may also include its own data storage system, such as database system 208. Additional components of computing platform 204 are discussed in greater detail below with reference to FIGS. 16, 17A, 17B, and 18.

Figure 3:
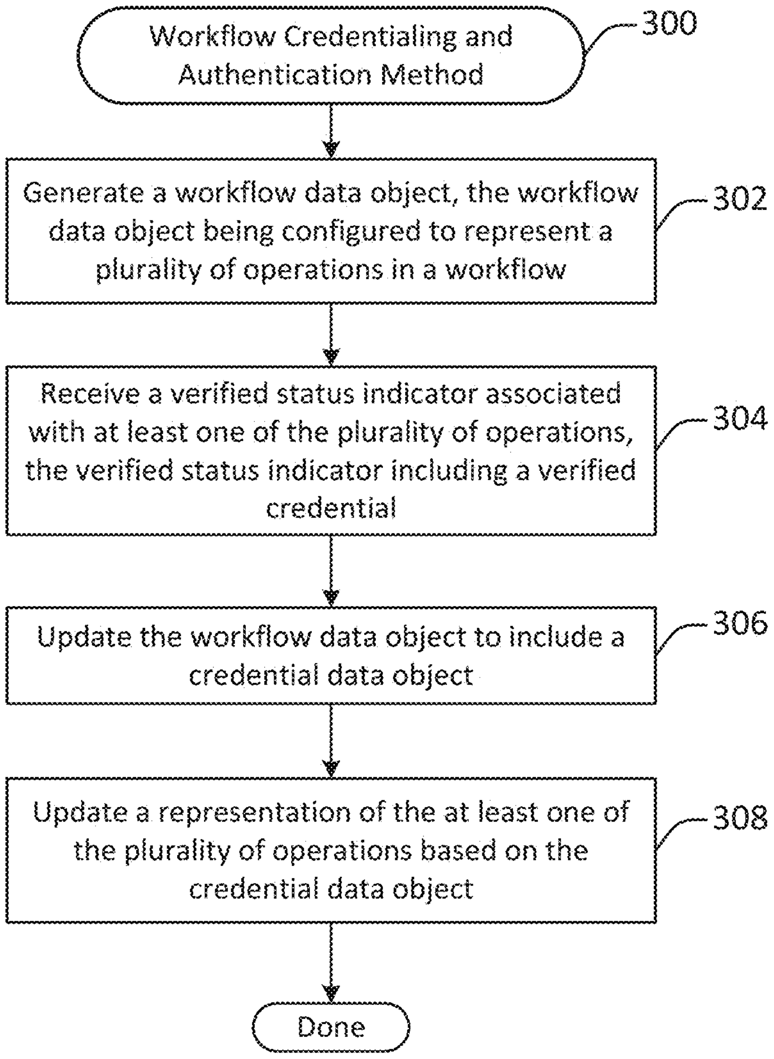
FIG. 3 illustrates an example of a method for credentialing and authentication, performed in accordance with one or more implementations.

FIG. 3 illustrates an example of a method for credentialing and authentication, performed in accordance with one or more implementations. As similarly discussed above, a method, such as method 300, may be implemented to facilitate the generation and implementation of a workflow data object. Accordingly, method 300 may be implemented to facilitate the generation and integration of verified status indicators within the context of a computing platform. Moreover, as will be discussed in greater detail below, such implementation and generation of verified status indicators may be automated or semi-automated.

Method 300 may commence with operation 302 during which a workflow data object may be generated. In various implementations, the workflow data object is configured to represent a plurality of operations in a workflow. As will be discussed in greater detail below, the workflow data object may be generated as part of an on-demand service, such as Work.com® provided by Salesforce.com®. Moreover, the workflow data object may include a series of operations represented as configurable data objects with which an entity, such as a user or administrator, may define a series of operations and dependencies between such operations, such as a defined order and set of conditions associated with each operation.

Method 300 may proceed to operation 304 during which a verified status indicator may be received. In various implementations, the verified status indicator is associated with at least one of the plurality of operations. Moreover, the verified status indicator may include a verified credential which, as will be discussed in greater detail below, may be generated in accordance with one or more verification and authentication standards. Accordingly, the verified status indicator may provide a trusted and verified indication that a particular condition has occurred or not occurred, and that indication may be specific to a particular operation in the workflow data object.

Method 300 may proceed to operation 306 during which the workflow data object may be updated. Accordingly, as discussed above, the verified status indicator may be received, and the workflow data object may be updated based on contents of the verified status indicator. As will be discussed in greater detail below, the updating may include updating a user interface associated with the workflow data object, generating one or more other data objects, as well as updating an active or selected operation. For example, the verified status indicator may cause the workflow to move from one operation to another. In various implementations, the workflow data object is updated to include a credential data object that may have been included in the verified status indicator. Accordingly, the workflow data object may store credential data objects in a dedicated storage location, and such credential data objects may be queried and/or displayed via user interface elements in a user interface screen.

Method 300 may proceed to operation 308 during which a representation of the at least one of the plurality of operations may be updated based on the credential data object. Accordingly, as discussed above, a user interface representing the workflow data object may be updated based on at least some of the changes and operations implemented during operation 306. For example, the user interface representing the workflow data object may be updated to include a graphical representation of the credential data object, and user interface elements representing one or more operations may be updated based on the changes discussed above, such as a progression from one operation to another. Additional details regarding the workflow data objects, verified status indicators, and such updates are discussed in greater detail below.

Figure 4:
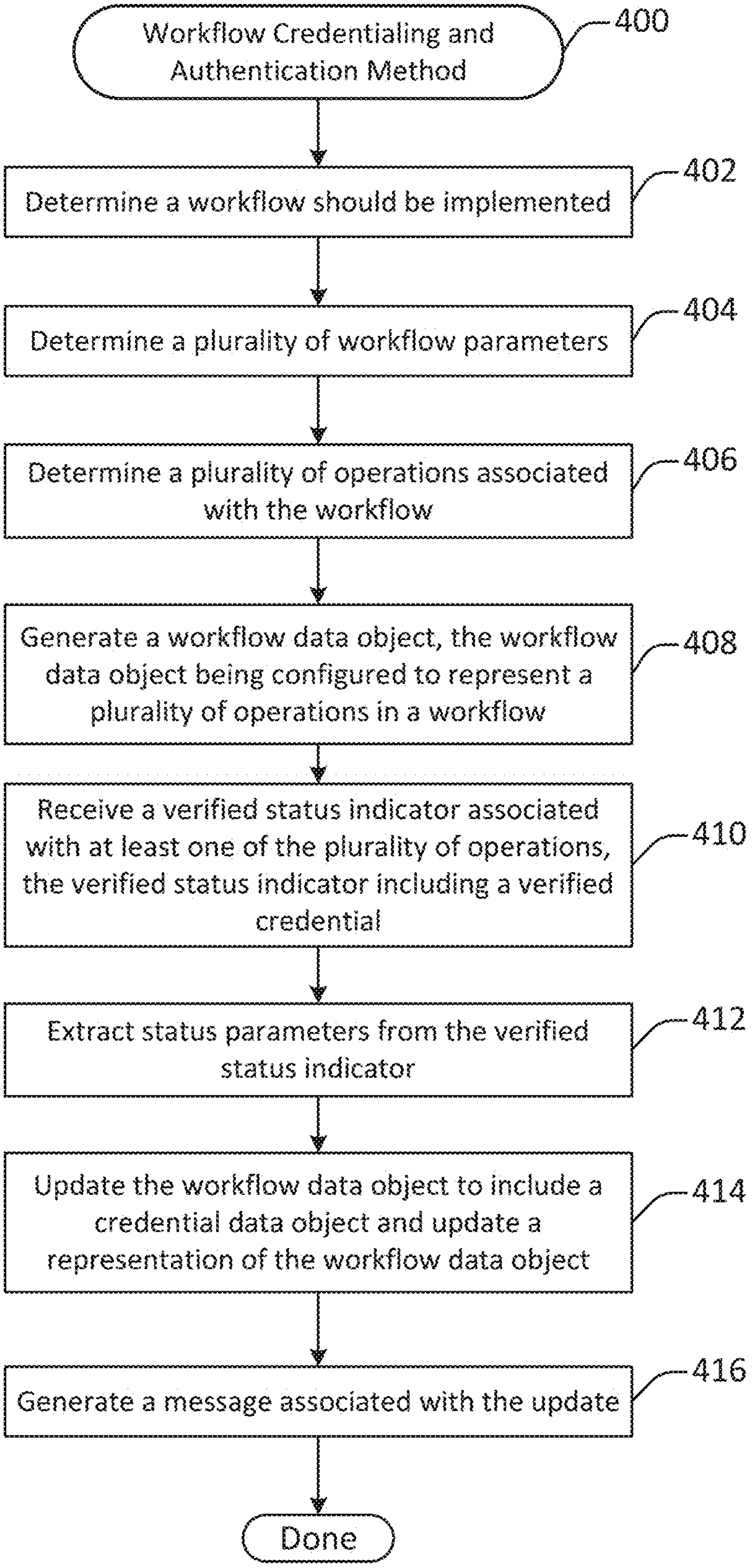
FIG. 4 illustrates another example of a method for credentialing and authentication, performed in accordance with one or more implementations.

FIG. 4 illustrates another example of a method for credentialing and authentication, performed in accordance with one or more implementations. As similarly discussed above, a method, such as method 400, may be implemented to facilitate the generation and implementation of a workflow data object. Accordingly, method 400 may be implemented to facilitate the generation and integration of verified status indicators within the context of a computing platform. Moreover, as will be discussed in greater detail below, such implementation and generation of verified status indicators may be implemented within the context of a custom workflow data object.

Method 400 may commence with operation 402 during which it may be determined that a workflow should be implemented. In various implementations, such a determination may be made by an entity, such as a user or administrator associated with an on-demand service. For example, a user of an on-demand application may determine that a workflow should be implemented to determine if another entity, such as a worker, has completed one or more operations required to return to work. The user may provide an input to the application that indicates that a workflow should be implemented. In some implementations, the determination that the workflow should be implemented may be made automatically. For example, a system component may detect and identify one or more conditions, such as a change in a user's status or one or more other aspects of associated user data, that may trigger the implementation of a workflow.

Method 400 may proceed to operation 404 during which a plurality of workflow parameters may be determined. In various implementations, the workflow parameters may be received from the user or administrator that determined the workflow should be implemented. For example, the workflow parameters may identify a type of workflow data object to be created, an identity of additional users associated with the workflow data object, as well as various other settings, such as security settings, associated with the workflow. As will be discussed in greater detail below, such workflow parameters may be used to configure aspects of the workflow data object that is ultimately generated.

Method 400 may proceed to operation 406 during which a plurality of operations associated with the workflow may be determined. In various implementations, the operations may be determined by the user or administrator that initially determined the workflow should be implemented. For example, the user may identify one or more operations that should be included in the workflow data object, and may also identify custom parameters associated with each operation. More specifically, the user may define particular operations to occur in a particular sequence, and may also define conditions or criteria associated with each operation in the sequence. In this way, the user may customize and define a sequence of operations to be included in a workflow data object. As will be discussed in greater detail below, the user may utilize a custom user interface and a configuration tool to configure the workflow data object in this manner.

Method 400 may proceed to operation 408 during which a workflow data object may be generated. As similarly discussed above, the workflow data object is configured to represent a plurality of operations in a workflow, and may be generated as part of an on-demand service, such as Work.com® provided by Salesforce.com®. Accordingly, the workflow data object may be generated based on the previously determined workflow parameters and operations. In this way, as previously discussed, the workflow data object may include a series of operations and dependencies between such operations, such as a defined order and set of conditions associated with each operation. The workflow data object may be stored in a datastore or database system, and may be made available to its associated users, as may have been defined by the workflow parameters, or one or more other access parameters, such as a user's role within an organization or membership to that organization. In this way, the workflow data object may be deployed and used by such users.

Method 400 may proceed to operation 410 during which a verified status indicator may be received. As similarly discussed above, the verified status indicator is associated with at least one of the plurality of operations. Moreover, the verified status indicator may include a verified credential which may be generated in accordance with one or more verification and authentication standards. Accordingly, the verified status indicator may provide a trusted and verified indication that a particular condition has occurred or not occurred, and that indication may be specific to a particular operation in the workflow data object. More specifically, a user may have taken an action, or interacted with a device, such as a local device, and such an interaction may have been detected. The verified status indicator may have been generated by, at least in part, the local device, to indicate that the interaction had occurred. In this way, the verified status indicator may provide verification of an occurrence of one or more operations in the workflow data object.

Method 400 may proceed to operation 412 during which status parameters may be extracted from the verified status indicator. Accordingly, one or more components of a computing platform may extract status parameters which may identify the workflow data object and operation associated with the verified status indicator, and may also include a credential data object. As will be discussed in greater detail below. The credential data object may be a verified credential configured to provide authentication in accordance with one or more authentication standards. In this way, the credential data object may include one or more data values configured to verify and authenticate status information associated with the operation noted above.

Method 400 may proceed to operation 414 during which the workflow data object may be updated. Accordingly, as discussed above, the verified status indicator may be received, and the workflow data object may be updated based on contents of the verified status indicator. As will be discussed in greater detail below, the updating may include updating a user interface associated with the workflow data object, generating one or more other data objects, as well as updating an active or selected operation. For example, the verified status indicator may cause the workflow to move from one operation to another. In various implementations, the workflow data object is updated to include a credential data object that may have been included in the verified status indicator. Accordingly, the workflow data object may store credential data objects in a dedicated storage location, and such credential data objects may be queried and/or displayed via user interface elements in a user interface screen.

Method 400 may proceed to operation 416 during which a message associated with the update may be generated. As discussed above, the update may have caused one or more actions, such as the selection of another subsequent operation in a workflow, or an identification of one or more other actions to be taken by a user. Thus, the message generated during operation 416 may include a confirmation message that an operation has taken place, a prompt for such actions from a user, or may include other associated data, such as requested data or data associated with the operation itself. It will be appreciated that operation 416 may be implemented optionally, and in some implementations, no message is generated, or instead a notification or other data object may be generated. For example, the notification may be generated and provided to other system components in the computing platform.

Figure 5:
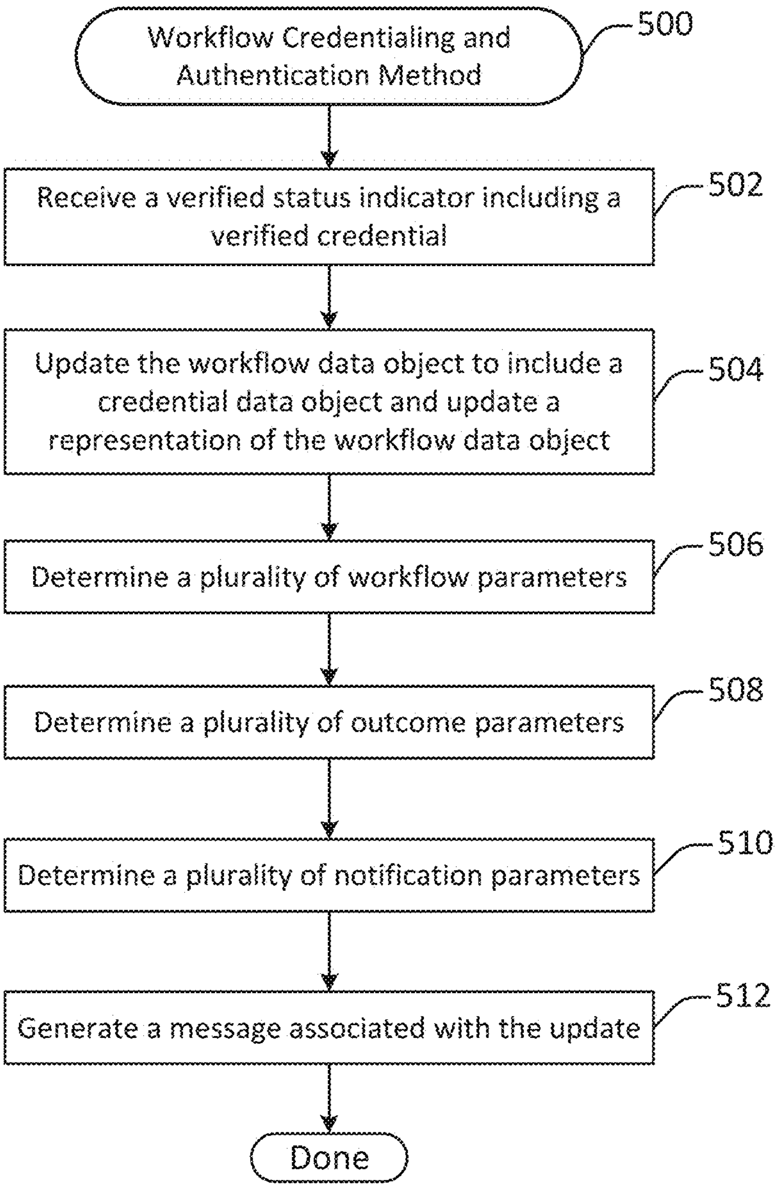
FIG. 5 illustrates yet another example of a method for credentialing and authentication, performed in accordance with one or more implementations.

FIG. 5 illustrates yet another example of a method for credentialing and authentication, performed in accordance with one or more implementations. As similarly discussed above, a method, such as method 500, may be implemented to facilitate the generation and implementation of a workflow data object. Accordingly, method 500 may be implemented to facilitate the generation and integration of verified status indicators within the context of a computing platform. Moreover, as will be discussed in greater detail below, such implementation and generation of verified status indicators may also include the generation and transmission of custom message data objects associated with such workflow data objects. Accordingly, a computing platform may generate and send custom messages to a user to actively guide them through a workflow specified by the workflow data object.

Method 500 may commence with operation 502 during which a verified status indicator may be received. As similarly discussed above, the verified status indicator may be associated with a user associated with an on-demand service hosted by a computing platform. The verified status indicator may have been generated based on one or more actions taken by the user, such as a checking in to a particular location, such as a pharmacy, or passing by a beacon with a mobile device. In various implementations, the user and the verified status indicator are associated with at least one of a plurality of operations included in a workflow data object. Moreover, the verified status indicator may include a verified credential which may be generated in accordance with one or more verification and authentication standards. Accordingly, the verified status indicator may provide a trusted and verified indication that a particular condition has occurred or not occurred, and that indication may be specific to a particular operation in the workflow data object. The verified status indicator may have been generated by, at least in part, a local device or an authentication system. Accordingly, the verified status indicator may provide verification of an occurrence of one or more operations in the workflow data object.

Method 500 may proceed to operation 504 during which a workflow data object may be updated to include the credential data object. Moreover, a representation of the workflow data object may also be updated. Accordingly, as discussed above, the verified status indicator may be received, and the workflow data object may be updated based on contents of the verified status indicator. For example, the verified status indicator may cause the workflow to move from one operation to another. In various implementations, the updating may include updating a user interface associated with the workflow data object, generating one or more other data objects, as well as updating an active or selected operation. For example, the workflow data object may be updated to include a credential data object that may have been included in the verified status indicator. Accordingly, the workflow data object may store credential data objects in a dedicated storage location, and such credential data objects may be queried and/or displayed via user interface elements in a user interface screen.

Thus, according to some implementations, during operation 504, an active or current operation associated with the user for a particular workflow data object may be updated. Accordingly, the workflow data object may operate as a state machine, and the current state may be updated. Additionally, as will be discussed in greater detail below, a user interface displaying a render of a visual representation of the workflow data object may also be updated to reflect the underlying updates to the workflow data object itself. Moreover, additional data objects may be generated, such as a visual representation of the verified status indicator. In one example, such visual representations may be presented as a "wallet" where each verified status indicator is rendered as a card displayed in book of cards, such as a wallet. Each render of a card may display identifying information associated with the verified status indicator, such as a time, date, location, and operation associated with the generation of the verified status indicator. In various implementations, the generation of the rendered visual representation may be implemented by the computing platform and based on data stored in the computing platform.

Method 500 may proceed to operation 506 during which a plurality of workflow parameters may be determined. As similarly discussed above, the workflow parameters may have been received from a user or administrator that initially configured the workflow data object. In some implementations, the workflow parameters may have been previously generated based on one or more designated values, such as a template or other automated process. The workflow parameters may identify a type of workflow data object that has been created, may identify operations within the workflow and their associated dependencies, as well as various other settings, such as security settings, associated with the workflow. In some implementations, such workflow parameters may be retrieved from a storage location of a computing platform.

Method 500 may proceed to operation 508 during which a plurality of outcome parameters may be determined. In various implementations, the outcome parameters may identify one or more additional operations as well as data associated with such additional operations. The additional operations may be operations that are downstream from the currently active operation. For example, an additional operation may be a next operation in the workflow data object. An additional operation may also include a final operation, or target operation of the workflow data object. Accordingly, during operation 508, the operations and dependencies identified in the workflow data object may be used to identify one or more downstream additional operations as well as associated data for each one. Such associated data may include criteria and conditions associated with each operation, as similarly discussed above.

Method 500 may proceed to operation 510 during which a plurality of notification parameters may be determined. In various implementation, the notification parameters identify information that is to be included in a notification, such as a message. For example, the notification parameters may identify at least some of the additional operations and the associated data determined during operation 508. More specifically, the notification parameters may identify a next operation that is to be taken by a user, and may also identify associated information, such as a location, contact information, as well as one or more requirements associated with the operation. The types of information and data included in the notification parameters may have been previously configured by a user or an administrator.

Method 500 may proceed to operation 512 during which a message may be generated. As discussed above, the update may have caused one or more actions, such as the selection of another subsequent operation in a workflow, or an identification of one or more other actions to be taken by a user. Thus, during operation 512, a message may be generated based, at least in part, on the notification parameters discussed above. Accordingly, the message may be generated to include the information identified by the notification parameters. For example, the message generated during operation 512 may include a confirmation message that an operation has taken place, a prompt for such actions from a user, or may include other associated data, such as requested data or data associated with the operation itself. It will be appreciated that operation 512 may be implemented optionally, and in some implementations, no message is generated, or instead a notification or other data object may be generated. For example, the notification may be generated and provided to other system components in the computing platform.

Figure 6:
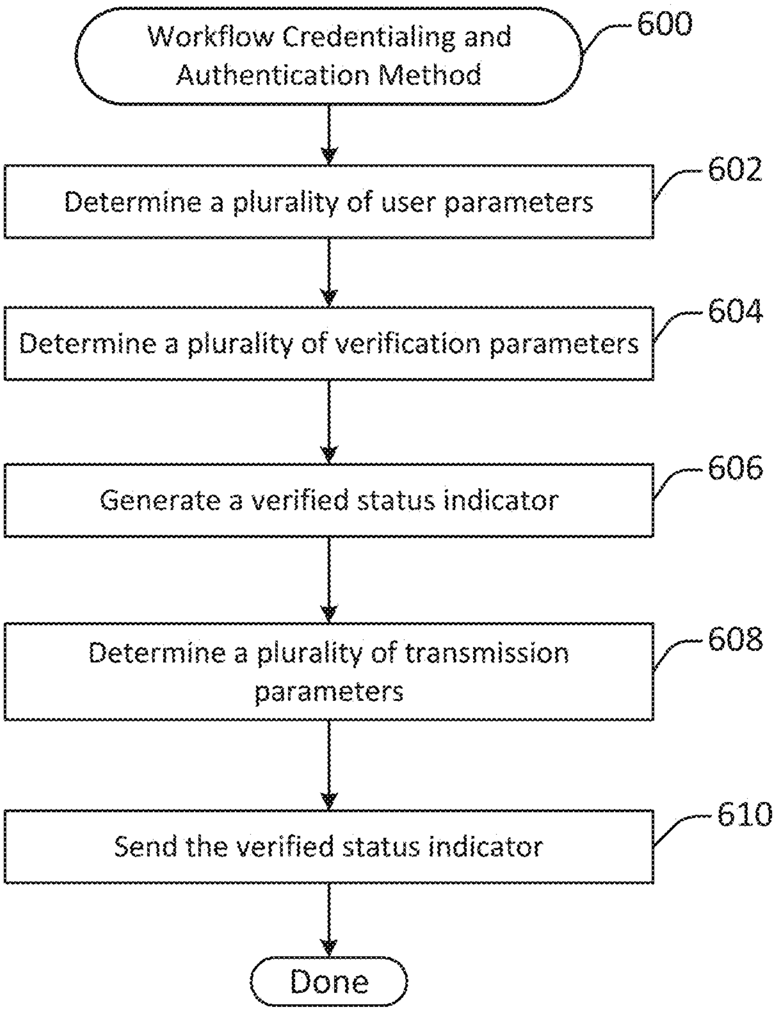
FIG. 6 illustrates an additional example of a method for credentialing and authentication, performed in accordance with one or more implementations.

FIG. 6 illustrates an additional example of a method for credentialing and authentication, performed in accordance with one or more implementations. As discussed above, the implementation of workflow data objects may be integrated with verified status indicators via one or more custom APIs. As will be discussed in greater detail below, a method, such as method 600, may be implemented to generate such verified status indicators. Accordingly, verified status indicators and associated credential data objects may be generated dynamically and across different distributed components of a system.

Method 600 may commence with operation 602 during which a plurality of user parameters may be determined. In various implementations, the user identifiers may include one or more identifiers that are unique to a particular user and that may also be specific to a particular storage system. For example, user identifier may be specific to a verification system and/or may be specific to an on-demand application provided by a computing platform. Such a user identifier may be stored locally on a client machine associated with the user, such as a mobile device. For example, the mobile device may support an application that provides an interface to the on-demand application, and such user identifiers may be stored locally on the mobile device. In various implementations, during operation 602, such a user identifier may be retrieved from the client machine. Moreover, other identifiers, such as a local device identifier or a hardware identifier associated with the mobile device, may also be retrieved.

Method 600 may proceed to operation 604 during which a plurality of verification parameters may be determined. In various implementations, the verification parameters may be parameters that are used to determine data that is to be included in a verified status indicator and a credential data object. The verification parameters are also used to identify one or more security and authentication operations that will be used to generate the verified status indicator and its associated credential data object. In various implementations, the verification parameters may include formatting parameters associated with one or more standards. For example, the verification parameters may include formatting parameters associated with standards such as HL7, FHIR, CCD, and/or CDA2 standards that may be specific to particular types of electronic data exchanges. In some implementations, the verification parameters may identify a particular verification standard, such as the Verifiable Credentials Data Model 1.0. Accordingly, the verification parameters may identify such a verification standard that identifies standards and requirements, such as identifiers and encryption techniques, to be used for verified status indicators and associated credential data objects.

Method 600 may proceed to operation 606 during which a verified status indicator may be generated. Thus, according to various implementations, a verified status indicator may be generated in accordance with the verification parameters. More specifically, the verification status indicator may be generated based on one or more formatting parameters, standards, and encryption techniques, as noted above. Accordingly, the verified status indicator may be generated in accordance with a particular standard of an electronic data exchange, and may also be generated in accordance with a designated encryption technique. For example, the verified status indicator may be generated based on public/private key sharing techniques. In another example, the verified status indicator may be generated based on blockchain/ledger encryption techniques.

Method 600 may proceed to operation 608 during which a plurality of transmission parameters may be determined. In various implementations, the transmission parameters may identify a target storage location as well as one or more associated target data objects for the verified status indicator. More specifically, the transmission parameters may identify a particular server included in the computing platform. Such transmission parameters may have been previously stored during a configuration process, as may have occurred during the installation of a local application. The transmission parameters may also be determined based on a query. For example, a verification server may query one or more components of a computing platform to determine where the verified status indicator should be sent, and if any additional identifiers should be included in the verified status indicator, as will be discussed in greater detail below.

Method 600 may proceed to operation 610 during which the verified status indicator may be sent. Accordingly, the verified status indicator may be sent in accordance with the transmission parameters. For example, a verification server may send the verified status indicator to a computing platform. In another example, the client machine may have received the verified status indicator from an authentication server and may forward the verified status indicator to the computing platform.

Figure 7:
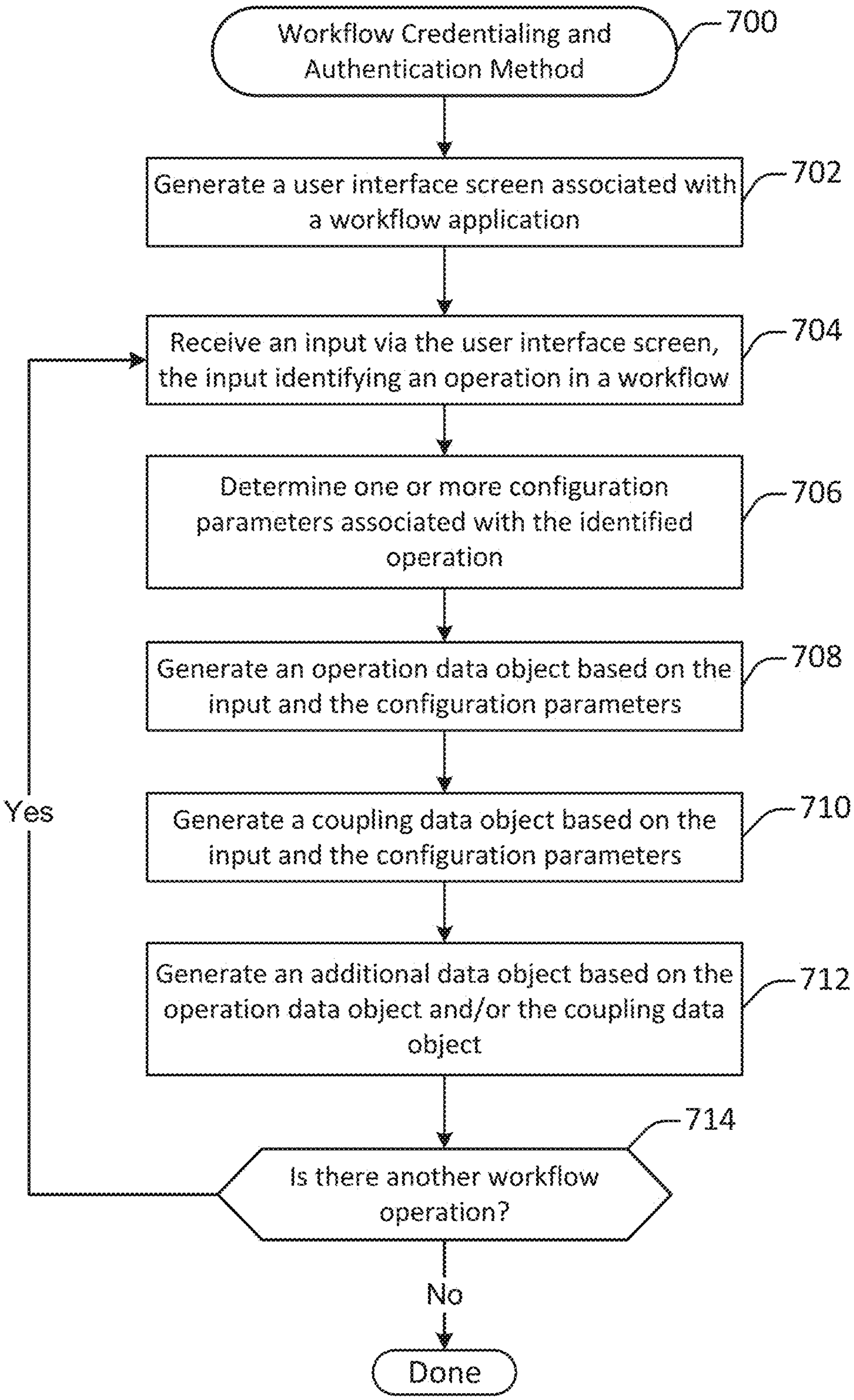
FIG. 7 illustrates another example of a method for credentialing and authentication, performed in accordance with one or more implementations.

FIG. 7 illustrates another example of a method for credentialing and authentication, performed in accordance with one or more implementations. As discussed above, a configuration tool may be used to generate workflow data objects. Accordingly, a method, such as method 700, may be used to identify operations to be included in a workflow data object, and to generate the workflow data object as well as its associated custom APIs and storage locations.

Method 700 may commence with operation 702 during which a user interface screen associated with a workflow application may be generated. As similarly discussed above and as will be discussed in greater detail below, a workflow data object may be visually represented in a user interface screen. Moreover, the user interface screen may be generated to enable creation and customization of the workflow data object and its underlying operations. For example, the user interface screen may be used to present a workflow data object configuration and generation tool. Accordingly, an entity, such as a user or administrator, may create a new workflow data object or may add to or modify an existing workflow data object via such a user interface screen.

Method 700 may proceed to operation 704 during which an input may be received via a user interface screen. Accordingly, the user may provide one or more inputs via one or more input devices, such as a mouse, a keyboard, and/or a touchscreen device. The input may specify one or more modifications to the workflow data object, such as the addition of an operation or the removal of an operation. In one example, the input identifies a type of an operation to be added, as well as a location within the workflow to add the operation.

Method 700 may proceed to operation 706 during which one or more configuration parameters may be determined. In various implementations, the configuration parameters may be used to identify particular conditions and requirements. For example, the configuration parameters may identify one or more conditions that must be met to proceed to a next operation in the workflow. The configuration parameters may also specify one or more API parameters that may define a particular type of verification to be implemented as well as a target verification system to be used. In this way, the configuration and generation tool may be used to define a custom API for every operation for which one is desired. More specifically, the implementation of verification and credentialing may be configured individually and for each operation included in the workflow data object.

Method 700 may proceed to operation 708 during which an operation data object may be generated based on the input and the configuration parameters. Accordingly, the operation may be generated based on the previously described input and configuration parameters, and the operation data object may be included in the workflow data object and stored accordingly. Moreover, configuration parameters for the custom API may also be stored if such an API is included in the operation data object.

Method 700 may proceed to operation 710 during which a coupling data object may be generated based on the input and the configuration parameters. In various implementations, the coupling data object is configured to define a relationship between different operations. For example, a coupling object may be a directional arrow from one operation to another. In this way, a user may specify an order of operations and a relationship between operations. The user may also specify one or more configuration parameters associated with the coupling data object. Such configuration parameters may provide an additional location to specify conditions or criteria for proceeding from one operation to another.

Method 700 may proceed to operation 712 during which an additional data object may be generated based on the operation data object and/or coupling data object. In various implementations, the additional data object may be a data structure that is configured to provide a custom storage location associated with the operation data object. More specially, the additional data object may be a storage location that is configured to store verified status indicators associated with the workflow data object. As discussed above, such verified status indicators may be stored in a storage location, and a visual representation may be rendered as a "wallet". In various implementations, during operation 712, such a storage location may be created, or may be identified if one already exists. For example, a particular user may have a dedicated storage location that is shared across multiple workflows. In this way, the additional data object may provide a centralized repository for that user's credential data objects.

Method 700 may proceed to operation 714 during which it may be determined if there is another workflow operation. Such a determination may be made based on an input received from a user. For example, the user may provide an input that indicates that additional operations are to be included in the workflow data object. In another example, the user may provide an input that indicates that the workflow data object is complete, or no additions are to be made at this time. If it is determined that there is another workflow operation, method 700 may return to operation 704. If it is determined that there is no additional workflow operation, method 700 may terminate.

Figure 8:
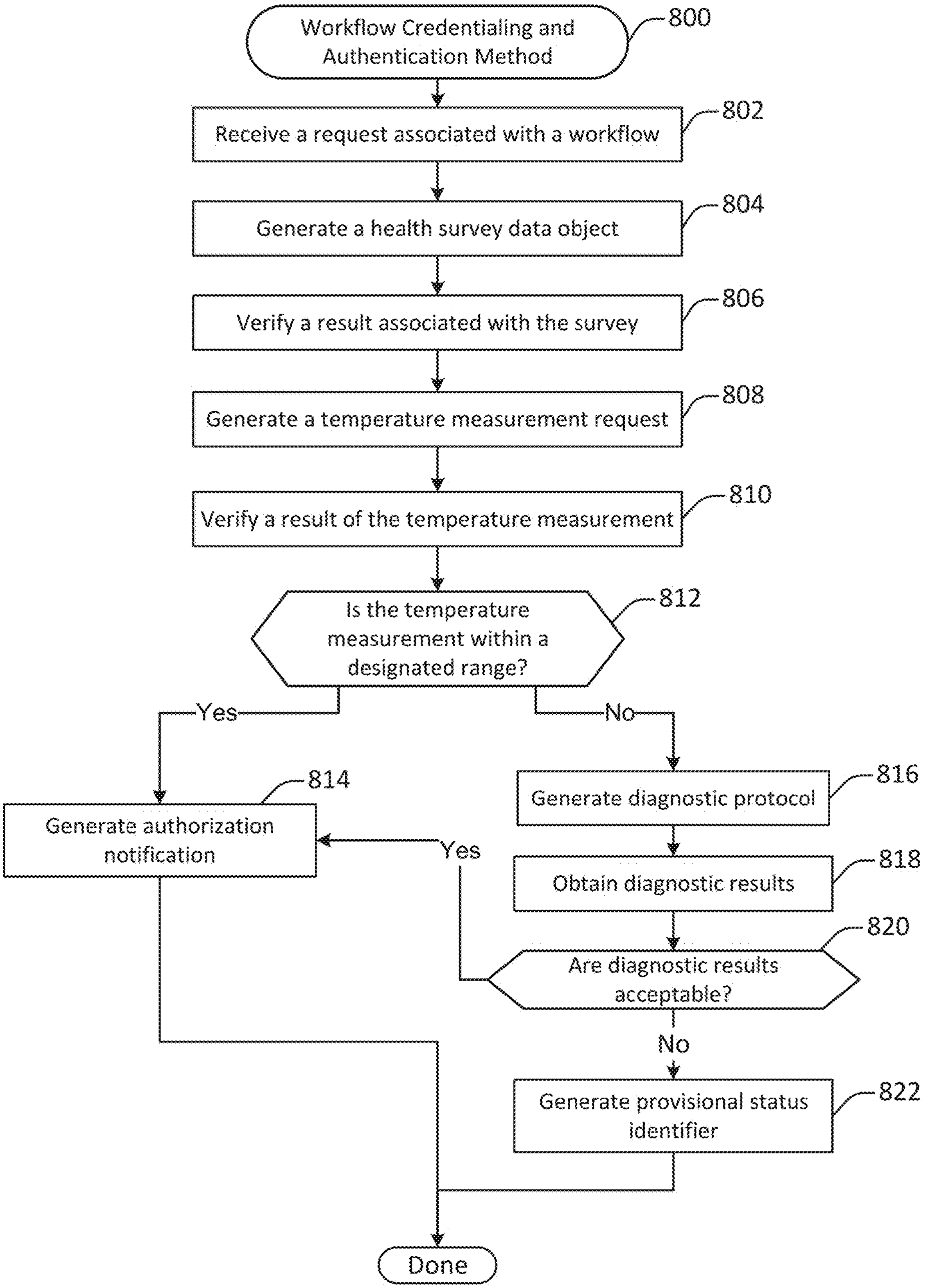
FIG. 8 illustrates an additional example of a method for credentialing and authentication, performed in accordance with one or more implementations.

FIG. 8 illustrates an additional example of a method for credentialing and authentication, performed in accordance with one or more implementations. As discussed above, workflow data objects may be used to implement workflows for organizations as well as entities associated with such organizations, such as users and/or workers. Accordingly, a method, such as method 800, may be used to implement a workflow that determines if a worker is safe to return to work. As similarly discussed above, method 800 integrates the use of verified status indicators to make such a determination.

Method 800 may commence with operation 802 during which a request may be received. In various implementations, the request may be received from a user via an application executed on a client machine, such as a mobile device. For example, the request may identify that the user has requested to come back to work after taking time off due to a sickness. The request may include a unique user identifier. The request may be received at a computing platform, and such a unique user identifier may be used to query a database of workflow data objects to identify one or more workflow data objects for that user. It will be appreciated that the query and identification of workflow data objects may be focused and narrowed by additional identifiers included in the request, such as an identifier that specifies a type of workflow data object. For example, the workflow data object may be a "return to work" workflow data object.

Method 800 may proceed to operation 804 during which a survey data object may be generated. In various implementation, the survey data object may be a health survey that includes one or more questions for the user regarding how the user feels, and if the user feels healthy enough to return to work. Accordingly, the survey data object may include one or more data fields configured to receive one or more inputs from the user. During operation 804, the survey data object may be generated and sent to the user for the user to fill out.

Method 800 may proceed to operation 806 during which a result associated with the survey data object may be verified. Accordingly, a component, such as a verification server may compare the results of the survey with an answer key, and may generate a verified status indicator that identifies the survey has been completed satisfactorily. As previously discussed, the verified status indicator may be sent to and stored at the computing platform, and may also be sent to the client machine.

Method 800 may proceed to operation 808 during which a temperature measurement request may be generated. Accordingly, the computing platform may generate and send a request to the user via the client machine, and such a request include instructions for the user regarding how to obtain and report a temperature measurement. Such instructions may have been previously specified when the workflow data object was initially configured, or may be retrieved from a dynamically referenced storage location.

Method 800 may proceed to operation 810 during which a result of the temperature measurement request may be verified. Accordingly, the user may get a temperature measurement, and the measurement may be verified by a verification system. More specifically, the verification system may include a verification server in communication with a local device at the location of the temperature measurement. For example, the temperature measurement may be made at a medical facility or a screening location. Thus, the local device may be authenticated to the verification server, and then the verification server may generate a verified status indicator that includes the results of the temperature measurement. In this way, the verified status indicator may provide verification of the location of the temperature measurement as well as verification of the measurement itself.

Method 800 may proceed to operation 812 during which it may be determined if the temperature measurement is within a designated range. In various implementations, such a determination may be made based on a designated temperature range that may have been determined by a user or system administrator. Accordingly, an administrator may have previously specified an acceptable temperature range. If the temperature measurement is within the designated range, method 800 may proceed to operation 814 during which an authorization notification may be generated. Such an authorization notification may provide the user with a verified message in one or more formats, such as a QR code. If the temperature measurement is not within the designated range, method 800 may proceed to operation 816.

Accordingly, during operation 816, a diagnostic protocol may be generated. In various implementations, the diagnostic protocol may identify one or more additional measurements and/or tests to be implemented. Moreover, such a diagnostic protocol may have been previously determined by a user or system administrator. Accordingly, the diagnostic protocol may identify one or more tests, such as a COVID-19 test, as well as additional information associated with such test, such as a location and time window. The diagnostic protocol may be included in a message that is sent to the user.

Method 800 may proceed to operation 818 during which diagnostic results may be obtained. Accordingly, the user may proceed to get any tests identified in the diagnostic protocol, and results of the tests may be sent to the computing platform. As discussed above, each test result may be verified and have an associated verified status identifier. In this way, verified status identifiers provide trusted authentication of each step via seamless integration with verification systems, but also provide a centralized storage location for those verified status identifiers.

Method 800 may proceed to operation 820 during which it may be determined if the diagnostic results are acceptable. As similarly discussed above, such a determination may be made based on a designated set of acceptable results, such as a negative test result, that may have been determined by a user or system administrator. If it is determined that the diagnostic results are acceptable, method 800 may proceed to operation 814 during which an authorization notification may be generated. If it is determined that the diagnostic results are not acceptable, method 800 may proceed to operation 822 during which a provisional status identifier may be generated.

Figure 9:
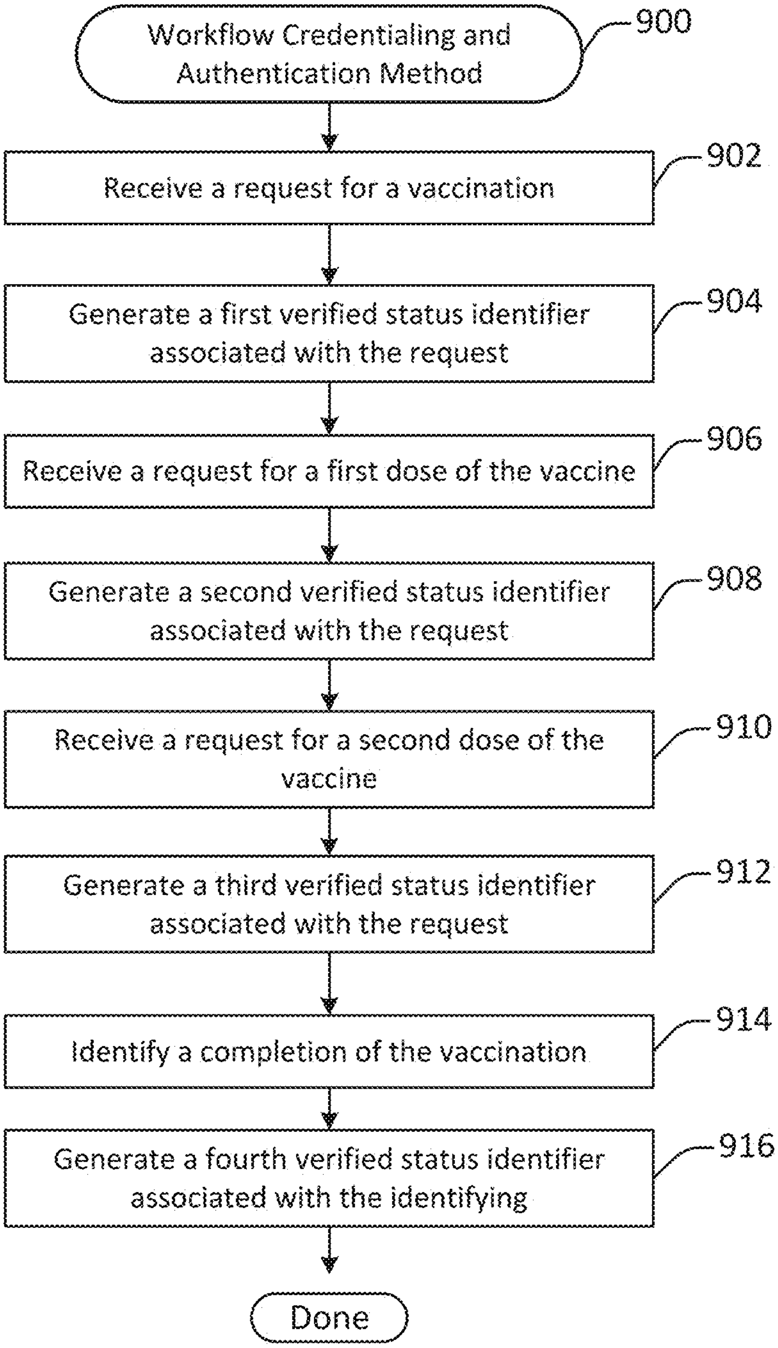
FIG. 9 illustrates yet another example of a method for credentialing and authentication, performed in accordance with one or more implementations.

FIG. 9 illustrates yet another example of a method for credentialing and authentication, performed in accordance with one or more implementations. As discussed above, workflow data objects may be used to implement workflows for organizations as well as entities associated with such organizations, such as users and/or workers. Accordingly, a method, such as method 900, may be used to implement a workflow that determines if a worker has received a vaccination. As similarly discussed above, method 900 integrates the use of verified status indicators to make such a determination.

Method 900 may commence with operation 902 during which a request may be received. As similarly discussed above, the request may be received from a user via an application executed on a client machine, such as a mobile device. In another example, the request may be received from a system component, such as a component of a computing platform, in response to identifying one or more new requirements for one or more users. In one example, the request may be to obtain a vaccination. As also discussed above, the request may include a unique user identifier. The request may be received at a computing platform, and such a unique user identifier may be used to query a database of workflow data objects to identify one or more workflow data objects for that user. As also discussed above, additional identifiers may also be included in the request.

Method 900 may proceed to operation 904 during which a first verified status identifier may be generated. In various implementations, the first verified status identifier is generated responsive to receiving the request at operation 902, and identifies that a vaccine has been requested. Accordingly, the first verified status identifier provides a trusted and verified indication that a request for a vaccine has been made for a particular user, and may also provide additional information such as the identity of the user as well as the requesting entity if different from the user.

Method 900 may proceed to operation 906 during which a request for a first dose may be received. Accordingly, the user may proceed along a designated sequence of operations to get vaccinated as specified by the workflow data object, and may request a first dose of the vaccine. As similarly discussed above, such a request may be made by the user via a client machine. Moreover, the request may be sent to one or more entities, including the computing platform, in accordance with the configuration of the operation data object. More specifically, the recipient and administrator of the first dose may be specified by the operation data object corresponding to the administration of the first dose in the workflow data object.

Method 900 may proceed to operation 908 during which a second verified status identifier may be generated. As similarly discussed above, the second verified status identifier is generated responsive to receiving the request at operation 906 as well as confirmation that a first dose has been administered if available, as may be provided by a local device at the vaccination site. Accordingly, the second verified status identifier provides a trusted and verified indication that a first dose of a vaccine has been requested and administered to a particular user, and may also provide additional information such as the identity of the user as well as the identity of the vaccine administrator.

Method 900 may proceed to operation 910 during which a request for a second dose may be received. As similarly discussed above, the user may proceed along a designated sequence of operations to get vaccinated as specified by the workflow data object, and may request a second dose of the vaccine. As also discussed above, such a request may be made by the user via a client machine. Moreover, the request may be sent to one or more entities, including the computing platform, in accordance with the configuration of the operation data object. More specifically, the recipient and administrator of the second dose may be specified by the operation data object corresponding to the administration of the second dose in the workflow data object.

Method 900 may proceed to operation 912 during which a third verified status identifier may be generated. As similarly discussed above, the third verified status identifier is generated responsive to receiving the request at operation 910 as well as confirmation that a second dose has been administered if available, as may be provided by a local device at the vaccination site. Accordingly, the third verified status identifier provides a trusted and verified indication that a second dose of the vaccine has been requested and administered to a particular user, and may also provide additional information such as the identity of the user as well as the identity of the vaccine administrator.

Method 900 may proceed to operation 914 during which a completion of vaccination may be identified. In one example, a component of the computing platform may identify completion of the vaccination for a user based on the verified status indicators stored for that user. In another example, completion may be identified based on a received message or notification. For example, upon completion of the second dose, the local device at the vaccine administrator may send the computing platform a message or notification indicating that vaccination is complete.

Method 900 may proceed to operation 916 during which a fourth verified status identifier may be generated. In various implementations, the fourth verified status identifier is generated responsive to determining vaccination has been completed. Such a determination may be made in response to identifying that the first, second, and third verified status indicators are included in the user's designated storage location. Accordingly, a configuration and composition of the user's verified status indicators may be used as configuration parameters for an operation data object. In this way, the fourth verified status identifier provides a trusted and verified indication that vaccination has been completed for a particular user, and may also provide additional information such as the identity of the user as well as the identity of the vaccine administrator.

Figure 10:
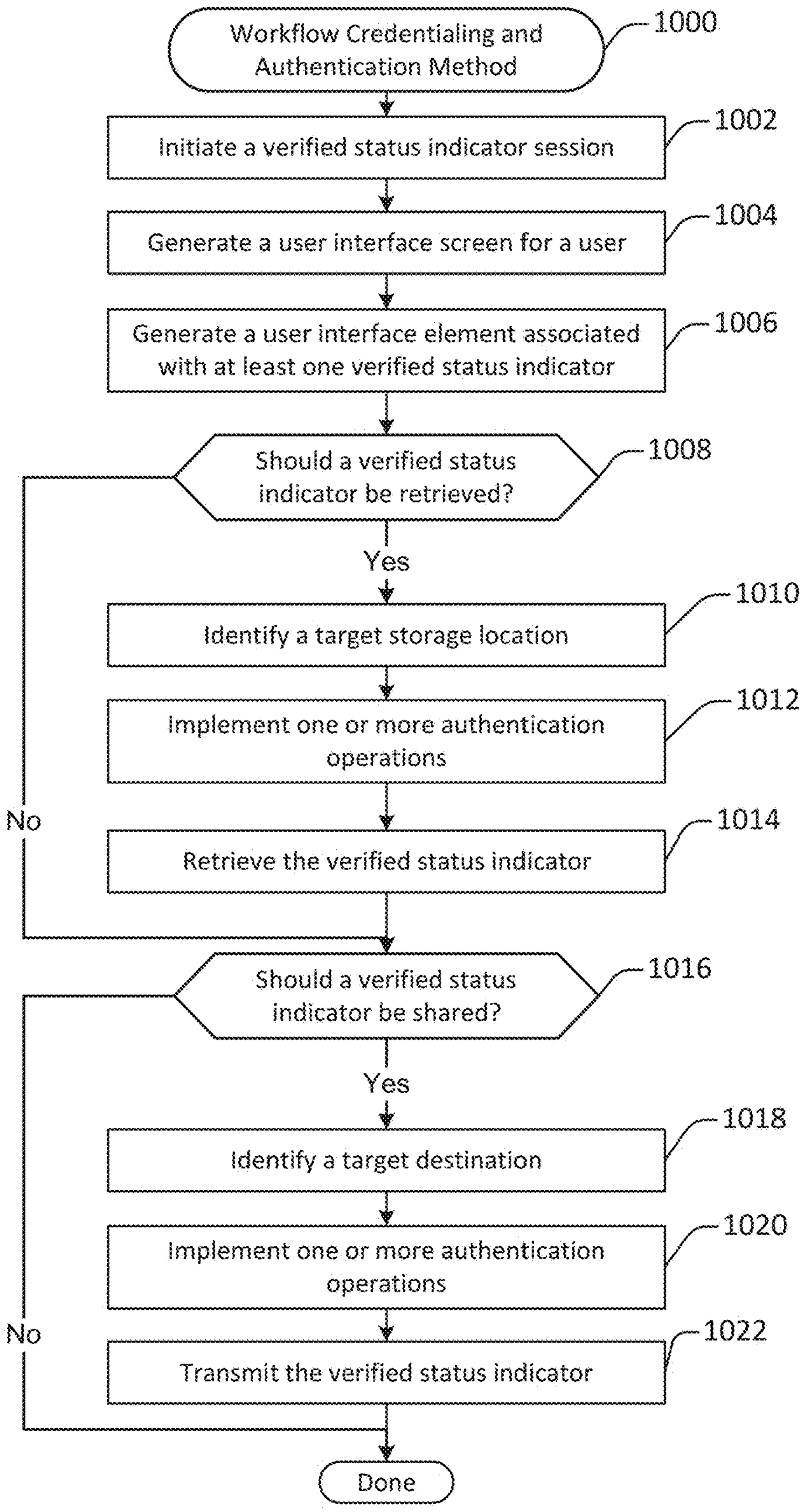
FIG. 10 illustrates an additional example of a method for credentialing and authentication, performed in accordance with one or more implementations.

FIG. 10 illustrates an additional example of a method for credentialing and authentication, performed in accordance with one or more implementations. As similarly discussed above, a user may have a dedicated storage location that used to store and maintain verified status indicators. In various implementations, a method, such as method 1000, may be implemented to facilitate the secure transmission and sharing of such verified status indicators.

Method 1000 may commence with operation 1002 during which a verified status indicator session may be initiated. In various implementations, the session may be initiated between a computing platform and one or more other entities, such as a client machine operated by a user. The verified status indicator session may be a communications session between the user and a chatbot implemented by the computing platform. For example, the chatbot may be configured present the user with a dialogue screen in which the user may provide one or more inputs as text or clicks/touches. More specifically, upon initiation, the computing platform may authenticate the user and the client machine, and may also retrieve data associated with the user, such as a storage location for the user's verified status identifiers.

Method 1000 may proceed to operation 1004 during which a user interface screen may be generated from a user. Accordingly, as similarly discussed above, the user interface screen may present the user with a prompt for additional information, such as a desired action to be taken, as will be discussed in greater detail below. As also discussed above, the user interface screen may be presented in the format of a chatbot to facilitate intuitive presentation of information to the user as well as collection of information from the user.

Method 1000 may proceed to operation 1006 during which a user interface element associated with at least one verified status indicator. Thus, according to some implementations, user interface elements may be generated and rendered based on existing verified status indicators associated with the user. More specifically, graphical representations of the user's verified status indicators may be generated and presented to the user as part of an interactive user interface screen. As previously discussed, the graphical representation may present as cards included in a "wallet". In this way, the chatbot and computing platform may provide an intuitive access tool to the user through which the user may manage his or her verified status indicators and associated credential data objects.

Method 1000 may proceed to operation 1008 during which it may be determined if a verified status indicator should be retrieved. Such a determination may be made based on an input received from the user. For example, the user may provide an input to the user interface screen that indicates that a particular verified status indicator should be retrieved from a particular entity. If it is determined that a verified status indicator should not be retrieved, method 1000 may proceed to operation 1016 discussed in greater detail below. If it is determined that a verified status indicator should be retrieved, method 1000 may proceed to operation 1010.

Accordingly, during operation 1010 a target storage location may be identified. Accordingly, the computing platform may identify a target storage location based on the entity identified in the received input. For example, the input may identify a particular company or organization. That company or organization may have a unique identifier stored by the computing platform, and the computing platform may use that unique identifier to query a database system of the computing platform, and to identify a storage location based on results of the query. In various implementations, the storage location may have been identified and stored in the database system during a previous configuration process, or as a result from a previous session. If no storage location is known, the computing platform may query the identified entity.

Method 1000 may proceed to operation 1012 during which one or more authentication operations may be implemented. Accordingly, the computing platform may initiate one or more authentication operations to authenticate itself to the entity, and authenticate the entity to the computing platform. In this way, the computing platform may establish an authenticated communications session with the target storage location.

Method 1000 may proceed to operation 1014 during which a verified status indicator may be retrieved. Accordingly, the computing platform may request the identified verified status indicator, and the verified status indicator may be provided to the computing platform and stored in the user's designated storage location. Furthermore, the user interface screen and graphical representation of the user's verified status indicators may be updated as well.

Method 1000 may proceed to operation 1016 during which it may be determined if a verified status indicator should be shared. Such a determination may be made based on another input received from the user. For example, the user may provide an input to the user interface screen that indicates that a particular verified status indicator should be shared to a particular entity. If it is determined that a verified status indicator should not be shared, method 1000 may terminated. If it is determined that a verified status indicator should be shared, method 1000 may proceed to operation 1018.

Accordingly, during operation 1018 a target destination may be identified. As similarly discussed above, the computing platform may identify a target destination based on the entity identified in the received input. For example, the input may identify a particular company or organization. That company or organization may have a unique identifier stored by the computing platform, and the computing platform may use that unique identifier to query a database system of the computing platform, and to identify a target destination associated with that entity. As also discussed above, the target destination may have been identified and stored in the database system during a previous configuration process, or as a result from a previous session. If no target destination is known, the computing platform may query the identified entity.

Method 1000 may proceed to operation 1020 during which one or more authentication operations may be implemented. Accordingly, as similarly discussed above, the computing platform may initiate one or more authentication operations to authenticate itself to the target entity, and authenticate the target entity to the computing platform. In this way, the computing platform may establish an authenticated communications session with the target entity.

Method 1000 may proceed to operation 1022 during which a verified status indicator may be transmitted. Accordingly, the computing platform may transmit the identified verified status indicator, and the verified status indicator may be provided to the target entity and stored in a designated storage location of the target entity. Furthermore, the user interface screen and graphical representation of the user's verified status indicators may be updated as well. For example, a graphical representation of the verified status indicator may be updated to include an icon or other visual representation indicating that the verified status indicator has been shared. The icon may be interactive, and in response to receiving an input, such as a click, may cause the display of information such as with which entities the verified status indicator has been shared.

While method 1000 has been discussed with reference to an entity, such as a chatbot, that may facilitate retrieval and sharing of verified status indicators, it will be appreciated that an entity, such as a chatbot may be implemented to facilitate other operations discussed above as well, such as the generation of messages within the context of a workflow data object. For example, the chatbot may present a user with a user interface configured to provide messages and receive replies in the context of a textual thread or conversation. Accordingly, messages prompting a user for action or providing information about what next operation may be required may be presented as text messages in a conversation thread. In this way, the chatbot may be configured to provide a user with intuitive conversational guidance through operations of a workflow data object.

Figure 11:
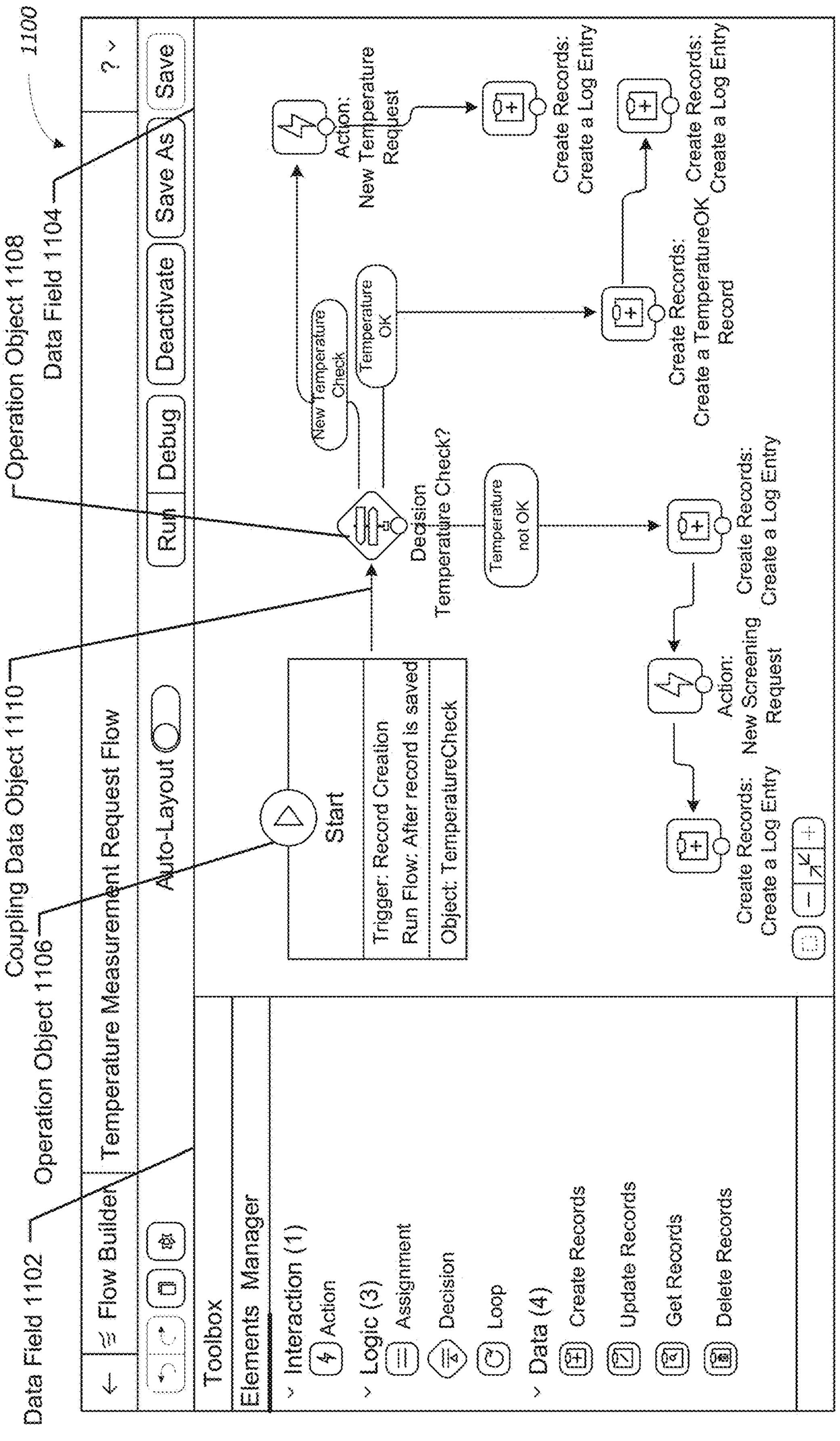
FIG. 11 illustrates an image of an example of a workflow data object configuration tool, configured in accordance with some implementations.

FIG. 11 illustrates an image of an example of a workflow data object configuration tool, configured in accordance with some implementations. As discussed above, a configuration tool may be used to generate and configure workflow data objects and operations included in workflow data objects. As will be discussed in greater detail below, the configuration tool enables the efficient and intuitive creation and deployment of operations and associated APIs for each operation in a workflow.

For example, as shown in image 1100, data field 1102 may include various different operation data objects that may be included in a workflow data object that is being created. Accordingly, data field 1102 provides a library or collection of available operation data objects. Such a list of operation data objects is customizable, and a user may create new operation data objects if desired.

Moreover, data field 1104 provides a view of the workflow data object being created, and the operations included in the workflow data object. For example, a start operation is shown by operation object 1106. A subsequent decision operation is shown by operation object 1108. Accordingly, each operation object may have an associated user interface element. Moreover, as shown by operation object 1106, conditions and criteria specific to each operation object may also be displayed. Furthermore, coupling data objects, such as coupling data object 1110, may also be shown to illustrate the coupling between operation objects and their relative dependencies.

In various implementations, operation objects may include custom APIs defined based on custom code defining one or more entities that will communicate via an API as well as permissible function calls supported by the API, as will be discussed in greater detail below. Moreover, such operation objects may be stored in a storage location of the computing platform such that are made available to other workflow data objects, as well as other accounts. In this way, operation object may be made available to and distributed amongst different workflow data objects, as well as across different user accounts within a computing platform. Accordingly, such operation objects may be deployed within the computational environment of the computing platform, and may be made widely available to other users of the computing platform as part of a shared operation object library.

Figure 12:
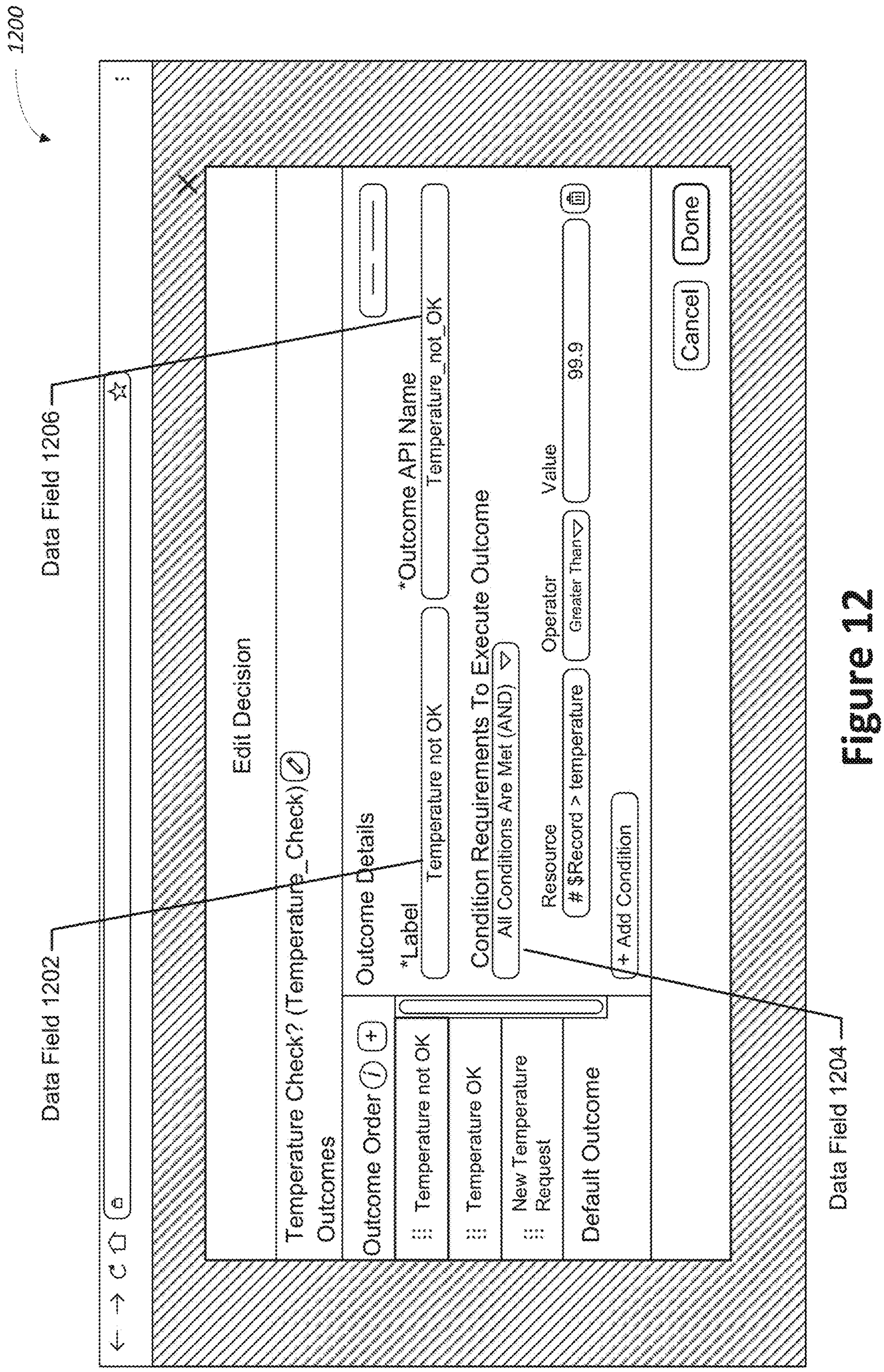
FIG. 12 illustrates an image of another example of a workflow data object configuration tool, configured in accordance with some implementations.

FIG. 12 illustrates an image of another example of a workflow data object configuration tool, configured in accordance with some implementations. In some embodiments, an additional user interface may be presented for a particular operation object that is being configured. For example, image 1200 illustrates a configuration screen that may be used to configure aspects of an operation object, as described above. More specifically, data fields 1202, 1204, and 1206 may be used to define conditions, outcomes, and labels associated with an operation object. In this way, each operation object may be interactive, and may have a dedicated user interface screen that facilitates configuration of the operation object.

Figure 13:
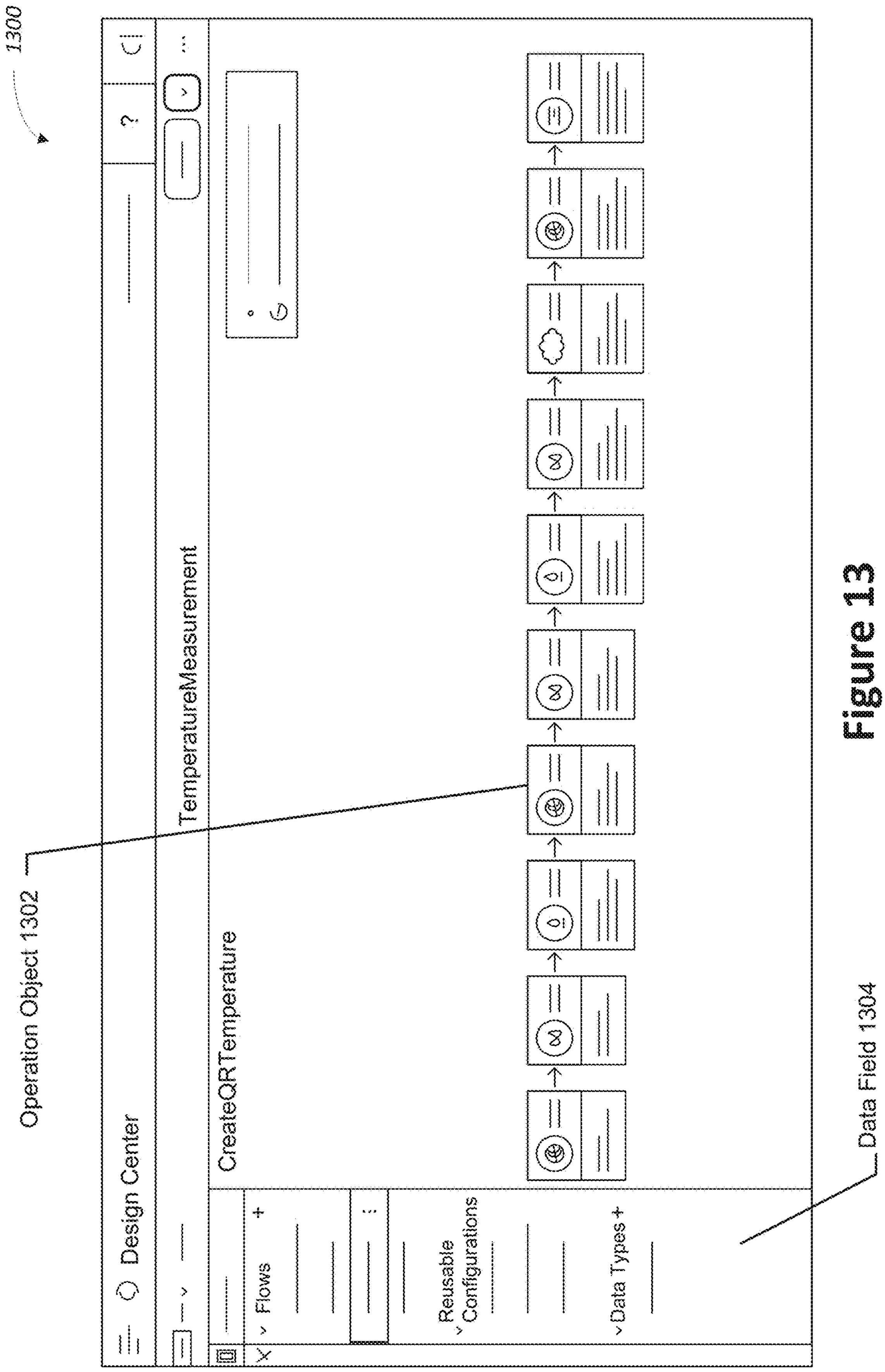
FIG. 13 illustrates an image of yet another example of a workflow data object configuration tool, configured in accordance with some implementations.

FIG. 13 illustrates an image of yet another example of a workflow data object configuration tool, configured in accordance with some implementations. Accordingly, image 1300 illustrates another view of a workflow data object in which a different view of operation objects is presented. As shown in image 1300, the presentation of the operations is streamlined and particular textual data is emphasized for each operation, such as operation object 1302. More specifically, operation object 1302 may itself include multiple data fields configured to store information such as a name and type of workflow operation associated with the operation object, as well as various aspects of a payload and one or more attributes of an API used to implement an operation. Moreover, data field 1304 provides a view of a hierarchy of flows through which a user may manage multiple flows that may exist within an operational hierarchy.

Figure 14:
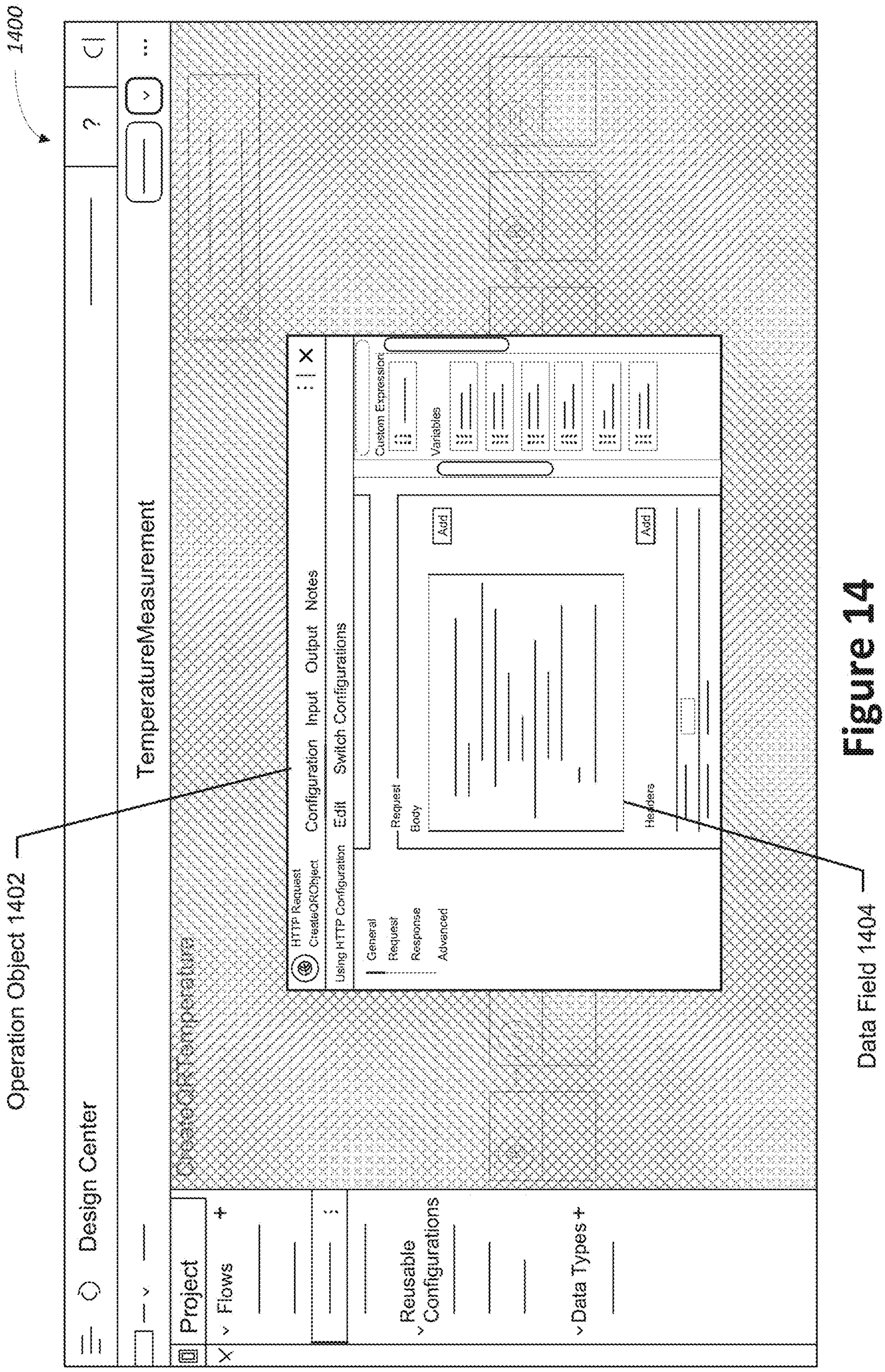
FIG. 14 illustrates an image of an additional example of a workflow data object configuration tool, configured in accordance with some implementations.

FIG. 14 illustrates an image of an additional example of a workflow data object configuration tool, configured in accordance with some implementations. Accordingly, image 1400 illustrates another view of a workflow data object in which additional configuration of operation objects is facilitated. As shown in image 1400, additional configuration of an operation object is possible via additional user interface screen 1402. As shown in FIG. 14, user interface screen 1402 may include data field 1404 that may be configured to receive custom code. Accordingly, a user may enter custom code that includes variable and function declarations that enable the user to customize the operational mechanics of an operation object as well as an API utilized by the operation object. In this way, the configuration tool enables the generation of custom APIs that may be defined by a user between one or more entities, such as a verification server associated with a credentialing system and a local device that may be implemented at an airline, a healthcare provider, or other entity, as discussed above. Furthermore, other features may also be included in the view of operation object 1402, such as a menu for custom expressions and variables, such as variables used to represent a payload, a password, an email address, a credential type, one or more identifiers, or any other suitable variable.

In one example, a user may identify and generate a workflow data object, as discussed above with at least reference to FIG. 11. For example, a user may generate a workflow data object that includes a sequence of operations to return to work after traveling to another country. The user may create multiple operation objects that may each configure a connection between one or more entities. For example, operation objects may configure and generate an API between a database system of an airline and multiple verification servers. In this way, a computing platform may manage the connection between the airline and the verification servers. More specifically, the computing platform may manage communication between the airline database system and the verification servers, and may implement an operational workflow associated with such communication, as described above. For example, notification messages sent to a user of the workflow, determinations of whether or not operations have been completed, as well as implementations and progression through subsequent operations may be managed by the computing platform. In one example, the API may be generated via an integration platform, such as MuleSoft® or Apex provided by Salesforce.com®. It will be appreciated that such features may be implemented in other contexts as well, such as student record verification/sharing and professional certification verification/sharing.

Figure 15:
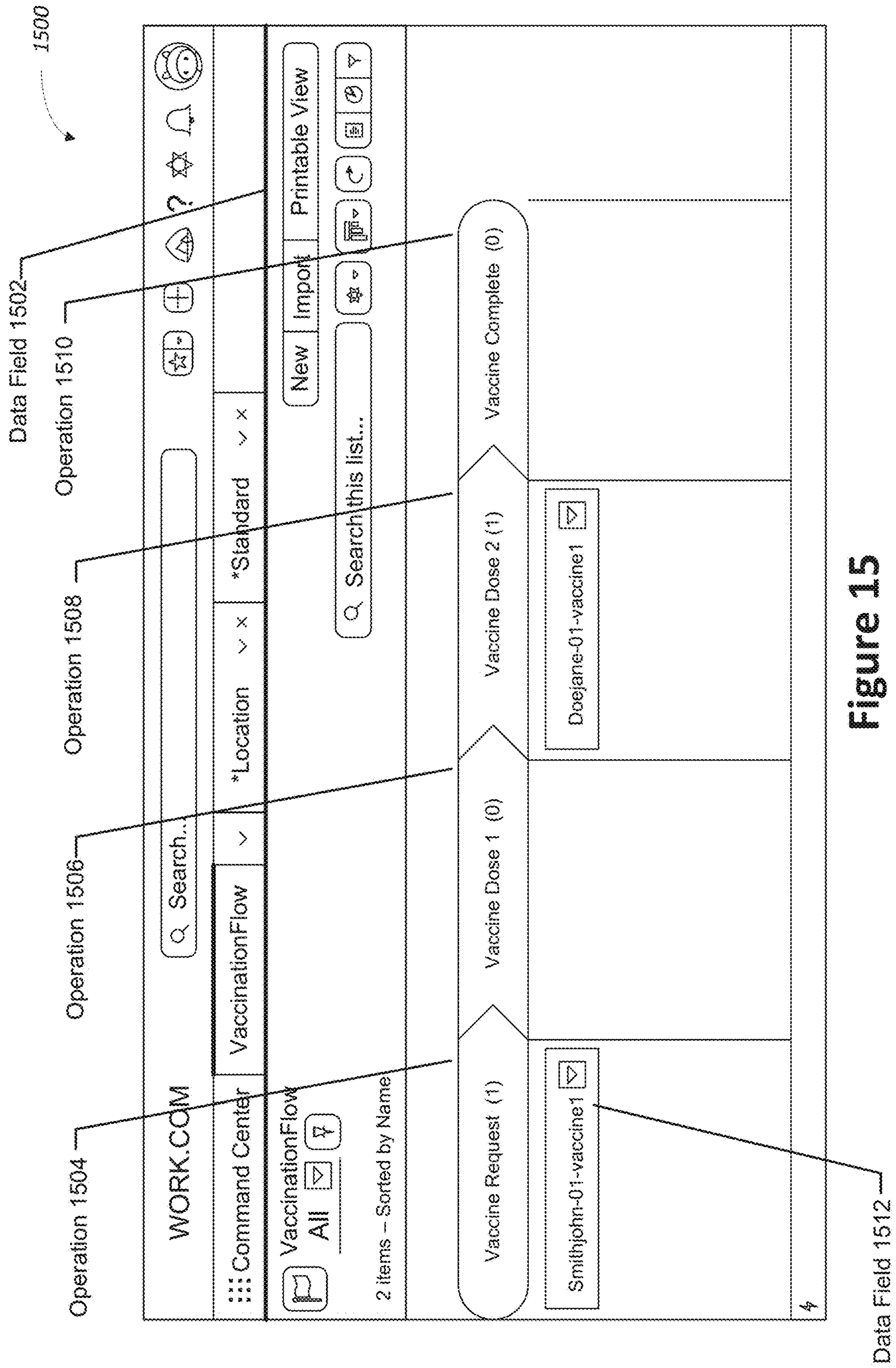
FIG. 15 illustrates an image of an example of a workflow data object visualization tool, configured in accordance with some implementations.

FIG. 15 illustrates an image of an example of a workflow data object visualization tool, configured in accordance with some implementations. Accordingly, image 1500 illustrates a user interface screen that may be used by a user to monitor progress in a workflow data object, as well as track verified status indicators associated with that workflow data object. For example, data field 1502 may be configured to display various different operations in a workflow, such as operation 1504, operation 1506, operation 1508, and operation 1510. Each operation may include text describing the operation as well as text identifying how many verified status indicators exist for each operation. Accordingly, each operation may also include a data field, such as data field 1512, that displays information about the identified verified status indicators for that operation. For example, data field 1512 illustrates one entry for one verified status indicator, and that entry is represented as text corresponding to a file name. In some implementations, the text is a hyperlink that links to the user's designated storage location, and the verified status indicator within that designated storage location. In some implementations, as shown in FIG. 15, a single workflow may be implemented for multiple users, and records shown for different users may be sorted, filtered, and displayed simultaneously in a unified view.

Figure 16:
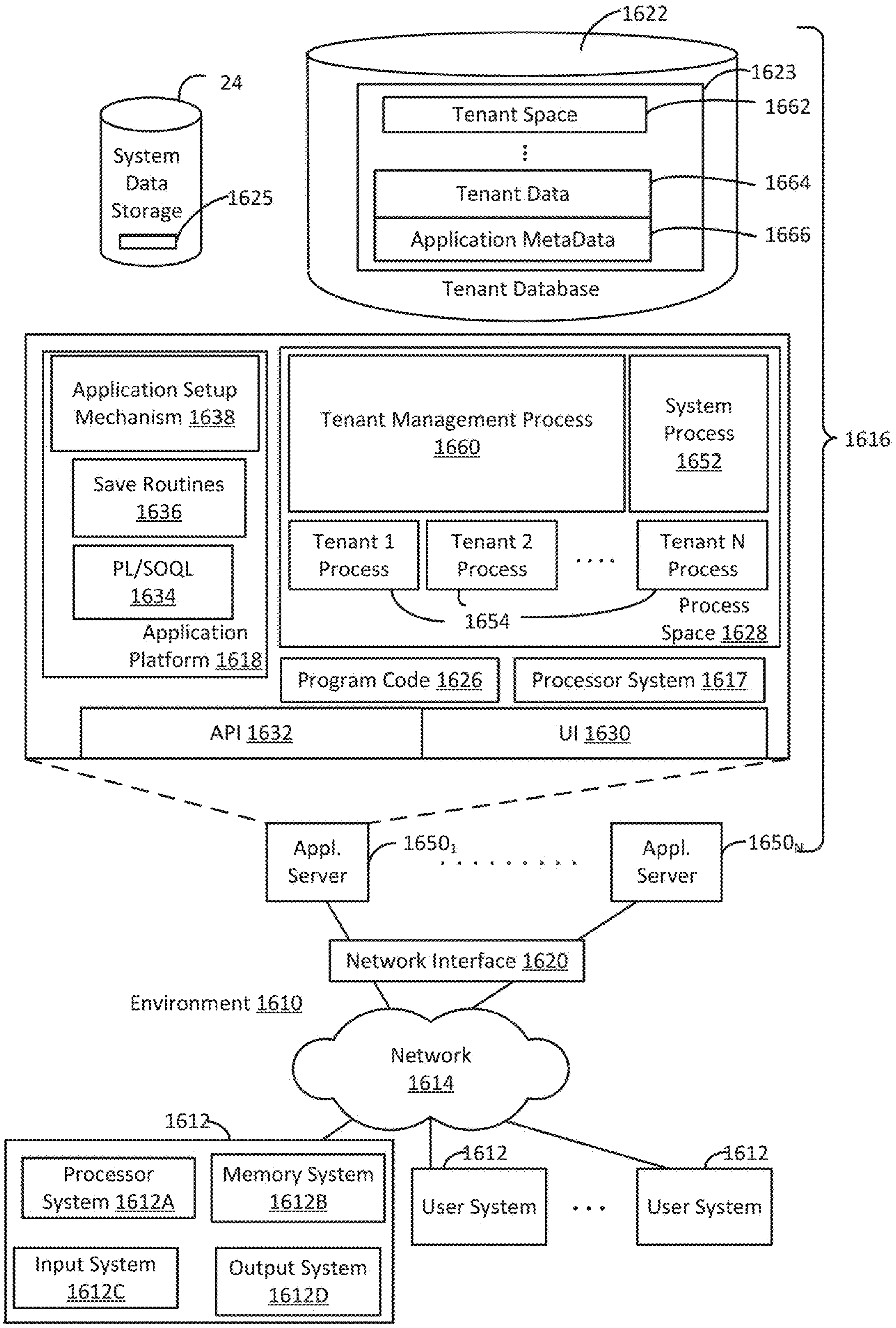
FIG. 16 shows a block diagram of an example of an environment that includes an on-demand database service configured in accordance with some implementations.

FIG. 16 shows a block diagram of an example of an environment 1610 that includes an on-demand database service configured in accordance with some implementations. Environment 1610 may include user systems 1612, network 1614, database system 1616, processor system 1617, application platform 1618, network interface 1620, tenant data storage 1622, tenant data 1623, system data storage 1624, system data 1625, program code 1626, process space 1628, User Interface (UI) 1630, Application Program Interface (API) 1632, PL/SOQL 1634, save routines 1636, application setup mechanism 1638, application servers 1650-1 through 1650-N, system process space 1652, tenant process spaces 1654, tenant management process space 1660, tenant storage space 1662, user storage 1664, and application metadata 1666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1618 may be a framework that allows the creation, management, and execution of applications in system 1616. Such applications may be developed by the database service provider or by users or third-party application developers accessing the service. Application platform 1618 includes an application setup mechanism 1638 that supports application developers' creation and management of applications, which may be saved as metadata into tenant data storage 1622 by save routines 1636 for execution by subscribers as one or more tenant process spaces 1654 managed by tenant management process 1660 for example. Invocations to such applications may be coded using PL/SOQL 1634 that provides a programming language style interface extension to API 1632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1666 for a subscriber making such an invocation. Such system processes may also manage execution of application metadata 1666 as an application in a virtual machine.

In some implementations, each application server 1650 may handle requests for any user associated with any organization. A load balancing function (e.g., an F5 Big-IP load balancer) may distribute requests to the application servers 1650 based on an algorithm such as least-connections, round robin, observed response time, etc. Each application server 1650 may be configured to communicate with tenant data storage 1622 and the tenant data 1623 therein, and system data storage 1624 and the system data 1625 therein to serve requests of user systems 1612. The tenant data 1623 may be divided into individual tenant storage spaces 1662, which can be either a physical arrangement and/or a logical arrangement of data. Within each tenant storage space 1662, user storage 1664 and application metadata 1666 may be similarly allocated for each user. For example, a copy of a user's most recently used (MRU) items might be stored to user storage 1664. Similarly, a copy of MRU items for an entire tenant organization may be stored to tenant storage space 1662. A UI 1630 provides a user interface and an API 1632 provides an application programming interface to system 1616 resident processes to users and/or developers at user systems 1612.

System 1616 may implement a web-based workflow authentication and verification system. For example, in some implementations, system 1616 may include application servers configured to implement and execute workflow management software applications as well as authentication and verification software applications. The application servers may be configured to provide related data, code, forms, web pages and other information to and from user systems 1612. Additionally, the application servers may be configured to store information to, and retrieve information from a database system. Such information may include related data, objects, and/or Webpage content. With a multi-tenant system, data for multiple tenants may be stored in the same physical database object in tenant data storage 1622, however, tenant data may be arranged in the storage medium(s) of tenant data storage 1622 so that data of one tenant is kept logically separate from that of other tenants. In such a scheme, one tenant may not access another tenant's data, unless such data is expressly shared.

Several elements in the system shown in FIG. 16 include conventional, well-known elements that are explained only briefly here. For example, user system 1612 may include processor system 1612A, memory system 1612B, input system 1612C, and output system 1612D. A user system 1612 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1612 to access, process and view information, pages and applications available from system 1616 over network 1614. Network 1614 may be any network or combination of networks of devices that communicate with one another, such as any one or any combination of a LAN (local area network), WAN (wide area network), wireless network, or other appropriate configuration.

The users of user systems 1612 may differ in their respective capacities, and the capacity of a particular user system 1612 to access information may be determined at least in part by "permissions" of the particular user system 1612. As discussed herein, permissions generally govern access to computing resources such as data objects, components, and other entities of a computing system, such as a workflow management system, a verification system, a social networking system, and/or a CRM database system. "Permission sets" generally refer to groups of permissions that may be assigned to users of such a computing environment. For instance, the assignments of users and permission sets may be stored in one or more databases of System 1616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1616 may provide on-demand database service to user systems 1612 using an MTS arrangement. By way of example, one tenant organization may be a company that employs a sales force where each salesperson uses system 1616 to manage their sales process. Thus, a user in such an organization may maintain contact data, leads data, customer follow-up data, performance data, goals and progress data, etc., all applicable to that user's personal sales process (e.g., in tenant data storage 1622). In this arrangement, a user may manage his or her sales efforts and cycles from a variety of devices, since relevant data and applications to interact with (e.g., access, view, modify, report, transmit, calculate, etc.) such data may be maintained and accessed by any user system 1612 having network access.

When implemented in an MTS arrangement, system 1616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1616 may also maintain system-level data usable by multiple tenants or other data. Such system-level data may include industry reports, news, postings, and the like that are sharable between tenant organizations.

In some implementations, user systems 1612 may be client systems communicating with application servers 1650 to request and update system-level and tenant-level data from system 1616. By way of example, user systems 1612 may send one or more queries requesting data of a database maintained in tenant data storage 1622 and/or system data storage 1624. An application server 1650 of system 1616 may automatically generate one or more SQL statements (e.g., one or more SQL queries) that are designed to access the requested data. System data storage 1624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 17A:
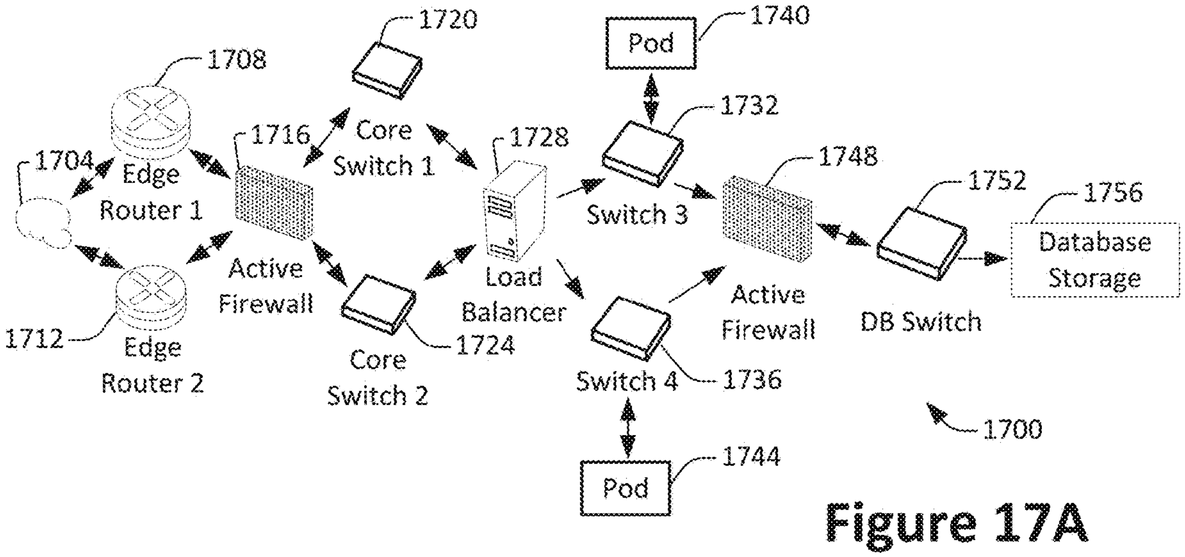
FIG. 17A shows a system diagram of an example of architectural components of an on-demand database service environment, configured in accordance with some implementations.

FIG. 17A shows a system diagram of an example of architectural components of an on-demand database service environment 1700, configured in accordance with some implementations. A client machine located in the cloud 1704 may communicate with the on-demand database service environment via one or more edge routers 1708 and 1712. A client machine may include any of the examples of user systems ?12 described above. The edge routers 1708 and 1712 may communicate with one or more core switches 1720 and 1724 via firewall 1716. The core switches may communicate with a load balancer 1728, which may distribute server load over different pods, such as the pods 1740 and 1744 by communication via pod switches 1732 and 1736. The pods 1740 and 1744, which may each include one or more servers and/or other computing resources, may perform data processing and other operations used to provide on-demand services. Components of the environment may communicate with a database storage 1756 via a database firewall 1748 and a database switch 1752.

Accessing an on-demand database service environment may involve communications transmitted among a variety of different components. The environment 1700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 17A and 17B.

The cloud 1704 refers to any suitable data network or combination of data networks, which may include the Internet. Client machines located in the cloud 1704 may communicate with the on-demand database service environment 1700 to access services provided by the on-demand database service environment 1700. By way of example, client machines may access the on-demand database service environment 1700 to retrieve, store, edit, and/or process workflow data object information or associated information, such as verified status indicators.

In some implementations, the edge routers 1708 and 1712 route packets between the cloud 1704 and other components of the on-demand database service environment 1700. The edge routers 1708 and 1712 may employ the Border Gateway Protocol (BGP). The edge routers 1708 and 1712 may maintain a table of IP networks or 'prefixes', which designate network reachability among autonomous systems on the internet.

In one or more implementations, the firewall 1716 may protect the inner components of the environment 1700 from internet traffic. The firewall 1716 may block, permit, or deny access to the inner components of the on-demand database service environment 1700 based upon a set of rules and/or other criteria. The firewall 1716 may act as one or more of a packet filter, an application gateway, a stateful filter, a proxy server, or any other type of firewall.

In some implementations, the core switches 1720 and 1724 may be high-capacity switches that transfer packets within the environment 1700. The core switches 1720 and 1724 may be configured as network bridges that quickly route data between different components within the on-demand database service environment. The use of two or more core switches 1720 and 1724 may provide redundancy and/or reduced latency.

In some implementations, communication between the pods 1740 and 1744 may be conducted via the pod switches 1732 and 1736. The pod switches 1732 and 1736 may facilitate communication between the pods 1740 and 1744 and client machines, for example via core switches 1720 and 1724. Also or alternatively, the pod switches 1732 and 1736 may facilitate communication between the pods 1740 and 1744 and the database storage 1756. The load balancer 1728 may distribute workload between the pods, which may assist in improving the use of resources, increasing throughput, reducing response times, and/or reducing overhead. The load balancer 1728 may include multilayer switches to analyze and forward traffic.

In some implementations, access to the database storage 1756 may be guarded by a database firewall 1748, which may act as a computer application firewall operating at the database application layer of a protocol stack. The database firewall 1748 may protect the database storage 1756 from application attacks such as structure query language (SQL) injection, database rootkits, and unauthorized information disclosure. The database firewall 1748 may include a host using one or more forms of reverse proxy services to proxy traffic before passing it to a gateway router and/or may inspect the contents of database traffic and block certain content or database requests. The database firewall 1748 may work on the SQL application level atop the TCP/IP stack, managing applications' connection to the database or SQL management interfaces as well as intercepting and enforcing packets traveling to or from a database network or application interface.

In some implementations, the database storage 1756 may be an on-demand database system shared by many different organizations. The on-demand database service may employ a single-tenant approach, a multi-tenant approach, a virtualized approach, or any other type of database approach. Communication with the database storage 1756 may be conducted via the database switch 1752. The database storage 1756 may include various software components for handling database queries. Accordingly, the database switch 1752 may direct database queries transmitted by other components of the environment (e.g., the pods 1740 and 1744) to the correct components within the database storage 1756.

Figure 17B:
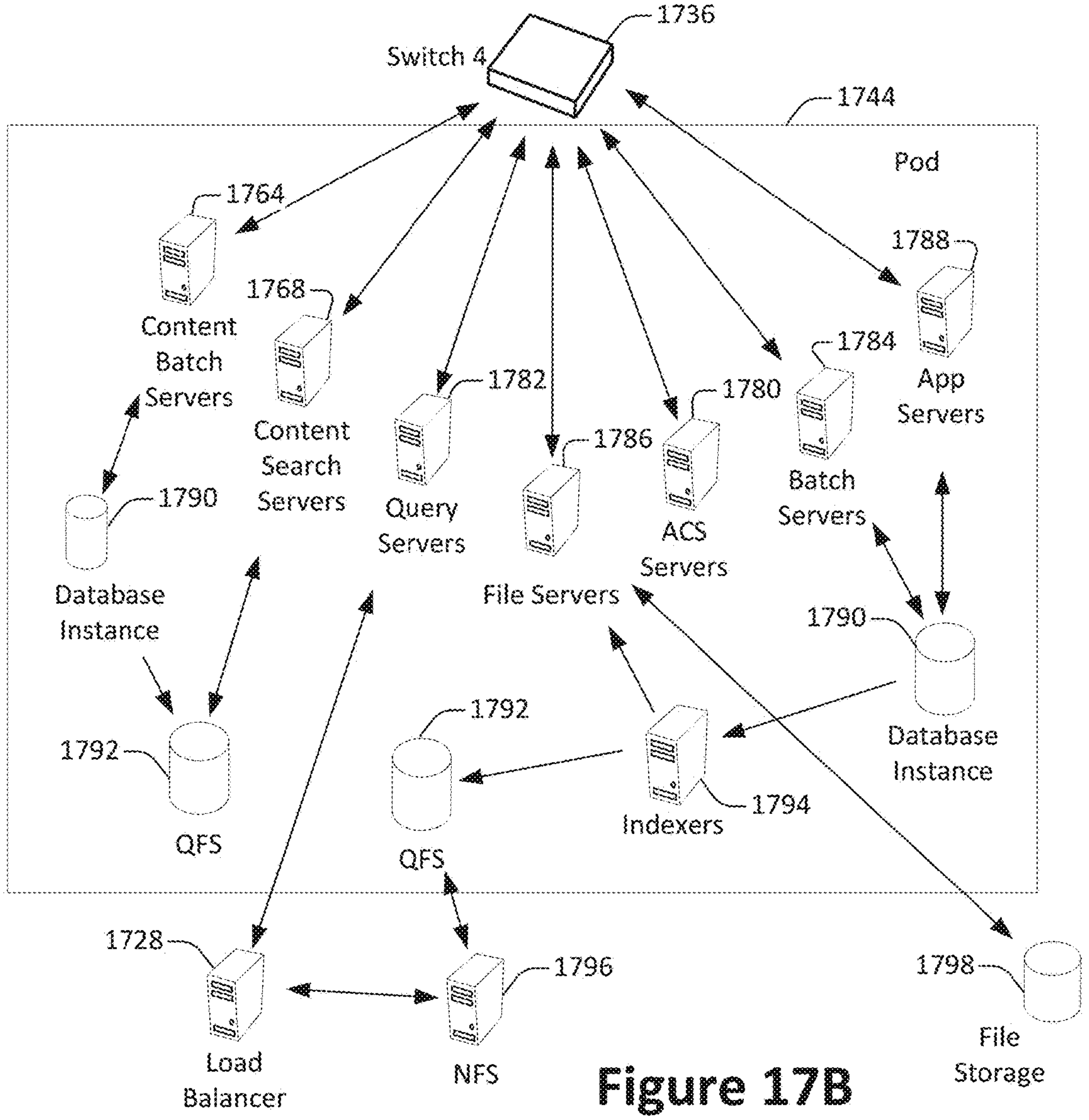
FIG. 17B shows a system diagram further illustrating an example of architectural components of an on-demand database service environment, in accordance with some implementations.

FIG. 17B shows a system diagram further illustrating an example of architectural components of an on-demand database service environment, in accordance with some implementations. The pod 1744 may be used to render services to user(s) of the on-demand database service environment 1700. The pod 1744 may include one or more content batch servers 1764, content search servers 1768, query servers 1782, file servers 1786, access control system (ACS) servers 1780, batch servers 1784, and app servers 1788. Also, the pod 1744 may include database instances 1790, quick file systems (QFS) 1792, and indexers 1794. Some or all communication between the servers in the pod 1744 may be transmitted via the switch 1736.

In some implementations, the app servers 1788 may include a framework dedicated to the execution of procedures (e.g., programs, routines, scripts) for supporting the construction of applications provided by the on-demand database service environment 1700 via the pod 1744. One or more instances of the app server 1788 may be configured to execute all or a portion of the operations of the services described herein.

In some implementations, as discussed above, the pod 1744 may include one or more database instances 1790. A database instance 1790 may be configured as an MTS in which different organizations share access to the same database, using the techniques described above. Database information may be transmitted to the indexer 1794, which may provide an index of information available in the database 1790 to file servers 1786. The QFS 1792 or other suitable filesystem may serve as a rapid-access file system for storing and accessing information available within the pod 1744. The QFS 1792 may support volume management capabilities, allowing many disks to be grouped together into a file system. The QFS 1792 may communicate with the database instances 1790, content search servers 1768 and/or indexers 1794 to identify, retrieve, move, and/or update data stored in the network file systems (NFS) 1796 and/or other storage systems.

In some implementations, one or more query servers 1782 may communicate with the NFS 1796 to retrieve and/or update information stored outside of the pod 1744. The NFS 1796 may allow servers located in the pod 1744 to access information over a network in a manner similar to how local storage is accessed. Queries from the query servers 1722 may be transmitted to the NFS 1796 via the load balancer 1728, which may distribute resource requests over various resources available in the on-demand database service environment 1700. The NFS 1796 may also communicate with the QFS 1792 to update the information stored on the NFS 1796 and/or to provide information to the QFS 1792 for use by servers located within the pod 1744.

In some implementations, the content batch servers 1764 may handle requests internal to the pod 1744. These requests may be long-running and/or not tied to a particular customer, such as requests related to log mining, cleanup work, and maintenance tasks. The content search servers 1768 may provide query and indexer functions such as functions allowing users to search through content stored in the on-demand database service environment 1700. The file servers 1786 may manage requests for information stored in the file storage 1798, which may store information such as documents, images, basic large objects (BLOBs), etc. The query servers 1782 may be used to retrieve information from one or more file systems. For example, the query system 1782 may receive requests for information from the app servers 1788 and then transmit information queries to the NFS 1796 located outside the pod 1744. The ACS servers 1780 may control access to data, hardware resources, or software resources called upon to render services provided by the pod 1744. The batch servers 1784 may process batch jobs, which are used to run tasks at specified times. Thus, the batch servers 1784 may transmit instructions to other servers, such as the app servers 1788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 18:
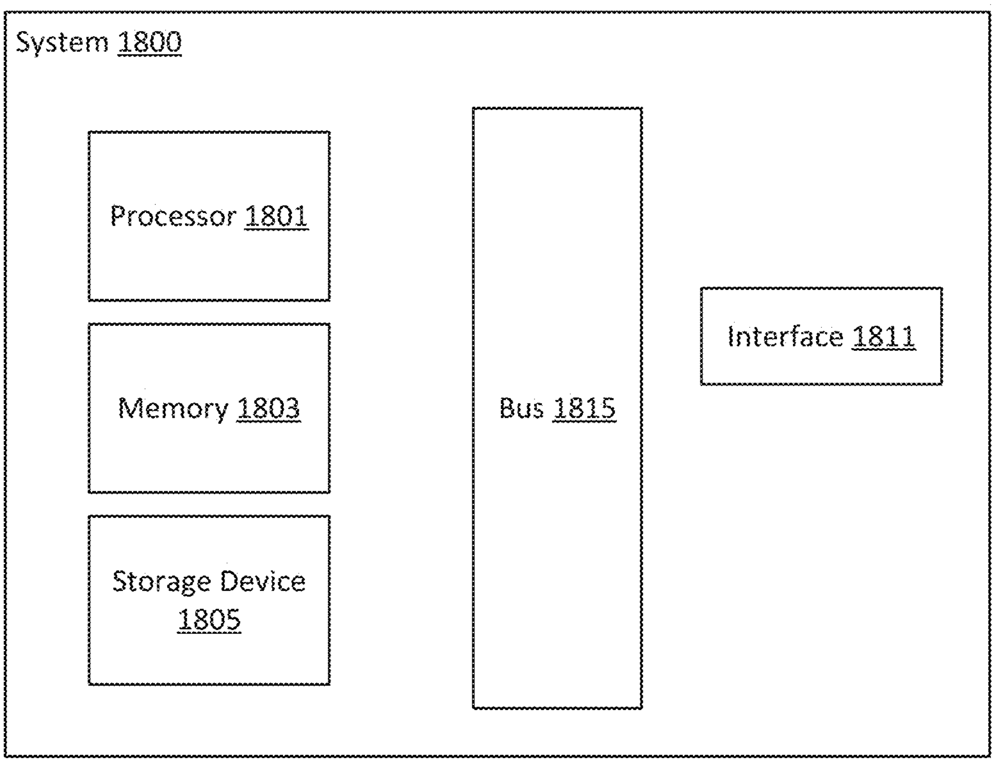
FIG. 18 illustrates one example of a computing device, configured in accordance with one or more implementations.

FIG. 18 illustrates one example of a computing device. According to various implementations, a system 1800 suitable for implementing implementations described herein includes a processor 1801, a memory module 1803, a storage device 1805, an interface 1811, and a bus 1815 (e.g., a PCI bus or other interconnection fabric.) System 1800 may operate as variety of devices such as an application server, a database server, or any other device or service described herein. Although a particular configuration is described, a variety of alternative configurations are possible. The processor 1801 may perform operations such as those described herein. Instructions for performing such operations may be embodied in the memory 1803, on one or more non-transitory computer readable media, or on some other storage device. Various specially configured devices can also be used in place of or in addition to the processor 1801. The interface 1811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some implementations include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific implementations including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular implementations may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A computing platform implemented using a server system, the computing platform comprising one or more hardware processors being configurable to cause:

initiating a communication session with a user, the user having a user account associated with a workflow data object implemented in an on-demand application hosted by the computing platform, the workflow data object being configured to represent a plurality of operations associated with the user and an organization, and further associated with a vaccination status of the user, the plurality of operations being a sequence of operations included in the workflow data object defined by operation data objects and coupling data objects defining dependencies between the operation data objects;

identifying a verified status indicator used by at least one of the plurality of operations represented in the workflow data object, the verified status indicator comprising a verified credential associated with at least one of the plurality of operations;

identifying a transfer operation associated with the verified status indicator and identifying a target entity based, at least in part, on the user account; and implementing the identified transfer operation based, at least in part, on the identified target entity such that the verified credential is transferred to the target entity, and the associated at least one of the plurality of operations of the workflow data object is updated based, at least in part, on the transfer operation, wherein the transfer operation comprises transmitting the verified status indicator to the target entity.

2. The computing platform of claim 1, wherein the transfer operation comprises receiving the verified status indicator from the target entity.

3. The computing platform of claim 1, wherein the verified status indicator comprises a verified credential generated in response to the user completing at least one of the plurality of operations.

4. The computing platform of claim 3, wherein the verified status indicator is generated based on an interaction between a mobile communications device and a local device located at a physical location of the user.

5. The computing platform of claim 1, wherein each of the plurality of operations has an associated operation data object.

6. The computing platform of claim 5, wherein the verified status indicator is received via an application program interface (API) defined, at least in part, by at least one operation data object.

7. The computing platform of claim 1, wherein the computing platform is further configurable to cause:

updating a selected operation within the workflow data object in response to implementing the transfer operation.

8. The computing platform of claim 7, wherein the computing platform is further configurable to cause:

updating a representation of the selected operation to identify an occurrence of the transfer operation.

9. A method comprising:

initiating a communication session with a user, the user having a user account associated with a workflow data object implemented in an on-demand application hosted by a computing platform, the workflow data object being configured to represent a plurality of operations associated with the user and an organization, and further associated with a vaccination status of the user, the plurality of operations being a sequence of operations included in the workflow data object defined by operation data objects and coupling data objects defining dependencies between the operation data objects;

identifying a verified status indicator used by at least one of the plurality of operations represented in the workflow data object, the verified status indicator comprising a verified credential associated with at least one of the plurality of operations;

identifying a transfer operation associated with the verified status indicator and identifying a target entity based, at least in part, on the user account; and implementing the identified transfer operation based, at least in part, on the identified target entity such that the verified credential is transferred to the target entity, and the associated at least one of the plurality of operations of the workflow data object is updated based, at least in part, on the transfer operation, wherein the transfer operation comprises transmitting the verified status indicator to the target entity.

10. The method of claim 9, wherein the transfer operation comprises:

receiving the verified status indicator from the target entity.

11. The method of claim 9, wherein the verified status indicator comprises a verified credential generated in response to the user completing at least one of the plurality of operations.

12. The method of claim 11, wherein the verified status indicator is generated based on an interaction between a mobile communications device and a local device located at a physical location of the user.

13. The method of claim 9 further comprising:

updating a selected operation within the workflow data object in response to implementing the transfer operation.

14. The method of claim 13 further comprising:

updating a representation of the selected operation to identify an occurrence of the transfer operation.

15. A computer program product comprising non-transitory computer-readable program code capable of being executed by one or more processors when retrieved from a non-transitory computer-readable medium, the program code comprising instructions configurable to cause the one or more processors to perform a method comprising:

initiating a communication session with a user, the user having a user account associated with a workflow data object implemented in an on-demand application hosted by the computing platform, the workflow data object being configured to represent a plurality of operations associated with the user and an organization, and further associated with a vaccination status of the user, the plurality of operations being a sequence of operations included in the workflow data object defined by operation data objects and coupling data objects defining dependencies between the operation data objects;

identifying a verified status indicator used by at least one of the plurality of operations represented in the workflow data object, the verified status indicator comprising a verified credential associated with at least one of the plurality of operations;

identifying a transfer operation associated with the verified status indicator and identifying a target entity based, at least in part, on the user account; and implementing the identified transfer operation based, at least in part, on the identified target entity such that the verified credential is transferred to the target entity, and the associated at least one of the plurality of operations of the workflow data object is updated based, at least in part, on the transfer operation, wherein the transfer operation comprises transmitting the verified status indicator to the target entity.

16. The computer program product recited in claim 15, wherein the transfer operation comprises:

receiving the verified status indicator from the target entity.

17. The computer program product recited in claim 16, wherein the method further comprises:

updating a selected operation within the workflow data object in response to implementing the transfer operation; and updating a representation of the selected operation to identify an occurrence of the transfer operation.

* * * * *